United States Patent
Dirisio

(12)
(10) Patent No.: US 6,687,457 B1
(45) Date of Patent: Feb. 3, 2004

(54) CAMERA FRAME ASSEMBLY HAVING FOUR-BAR LINKAGE SHUTTER ACTUATOR

(75) Inventor: Anthony Dirisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/324,488

(22) Filed: Dec. 20, 2002

(51) Int. Cl.[7] .............................. G03B 17/02; G03B 9/08
(52) U.S. Cl. ........................ 396/6; 396/462; 396/493; 396/463; 396/502
(58) Field of Search ........................ 396/6, 452, 462, 396/493, 502

(56) References Cited

U.S. PATENT DOCUMENTS

| | | |
|---|---|---|
| 2,525,160 A | 10/1950 | Walker |
| 3,318,217 A | 5/1967 | Ernisse |
| 3,512,466 A | 5/1970 | Fauth et al. |
| 3,672,280 A | 6/1972 | Imura |
| 4,023,192 A | 5/1977 | Simon et al. |
| 4,110,771 A * | 8/1978 | Kindig ..................... 396/389 |
| 4,595,269 A | 6/1986 | Wong |
| 4,725,864 A | 2/1988 | Ogawa et al. |
| 5,510,866 A | 4/1996 | Solomon et al. |
| 5,555,053 A | 9/1996 | Stephenson, III |
| 5,614,975 A | 3/1997 | SanGregory et al. |
| 6,033,133 A | 3/2000 | DiRisio et al. |
| 6,086,268 A | 7/2000 | DiRisio |
| 6,561,704 B2 * | 5/2003 | Richiuso et al. ............ 396/472 |

FOREIGN PATENT DOCUMENTS

JP   2-105127   4/1990

* cited by examiner

Primary Examiner—David M. Gray
(74) Attorney, Agent, or Firm—Robert Luke Walker

(57) ABSTRACT

A camera fame assembly has a frame and a pair of tie bars extending outward from the frame. The tie bars each have opposed first and second ends. The first ends are spaced apart. The first ends are each pivotally joined to the frame. A parallel bar is pivotally joined to the second ends of the tie bars. The parallel bar is spaced outward from the frame. The parallel bar is movable, relative to the frame, from a charged position to a discharged position. A striker is movable with the parallel bar between the charged and discharged positions. An impact shutter is movable from a closed position to an open position by the striker.

18 Claims, 25 Drawing Sheets

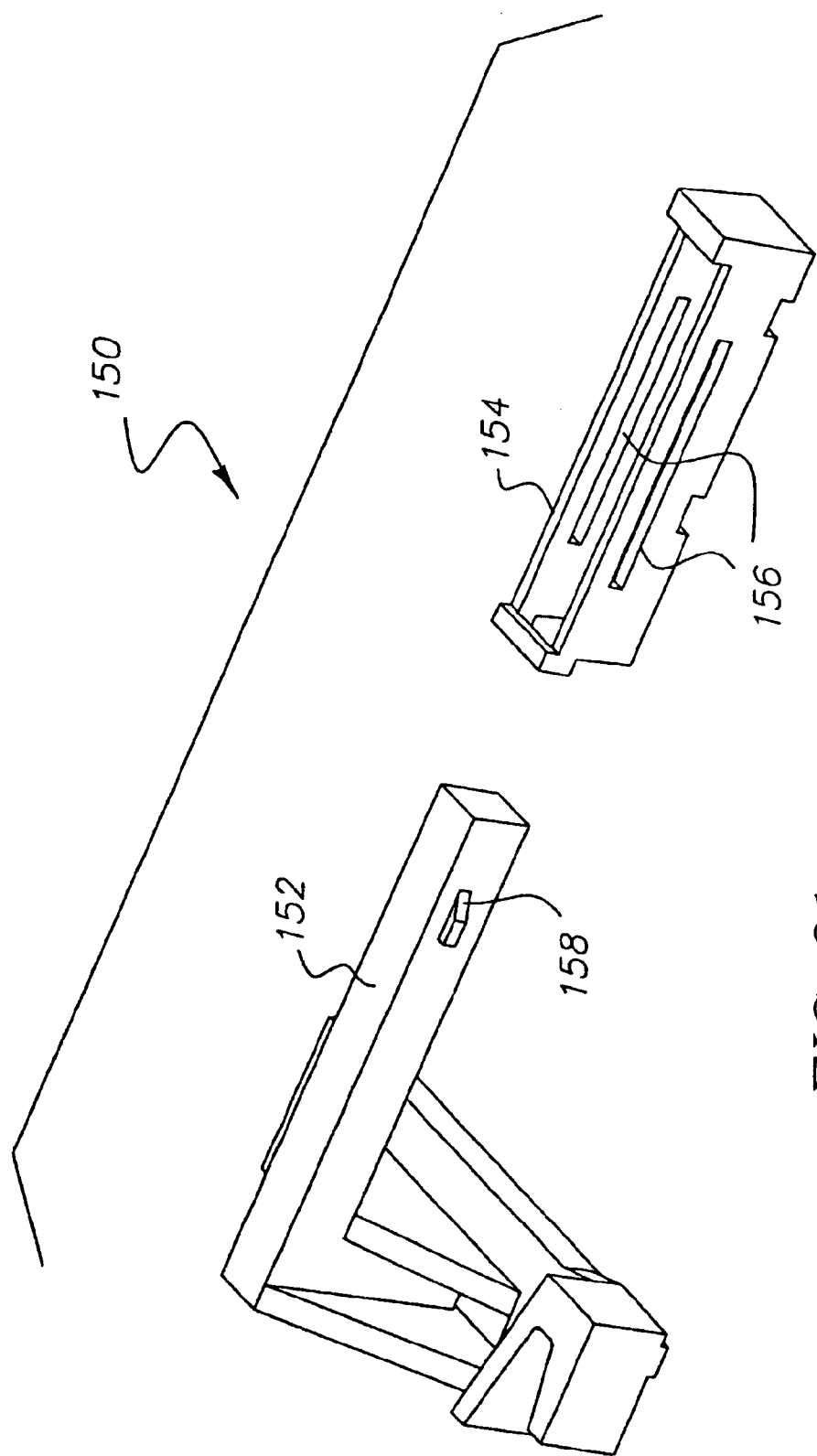

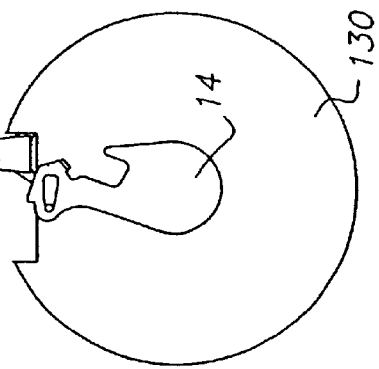
FIG. 22
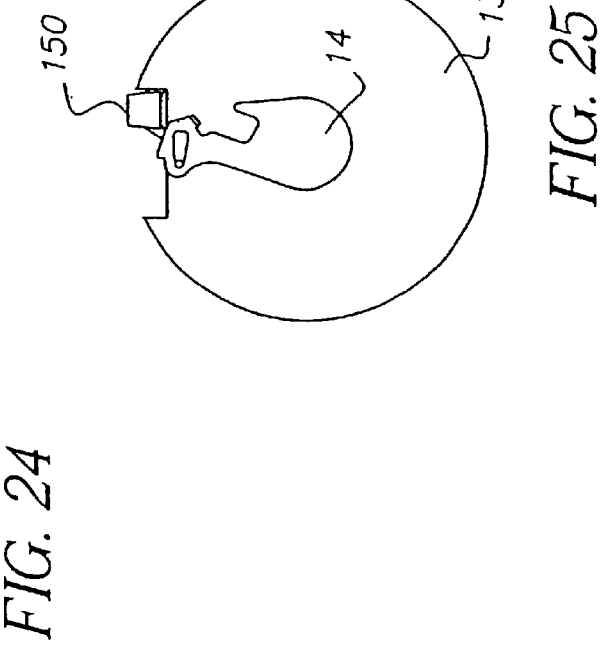
FIG. 23
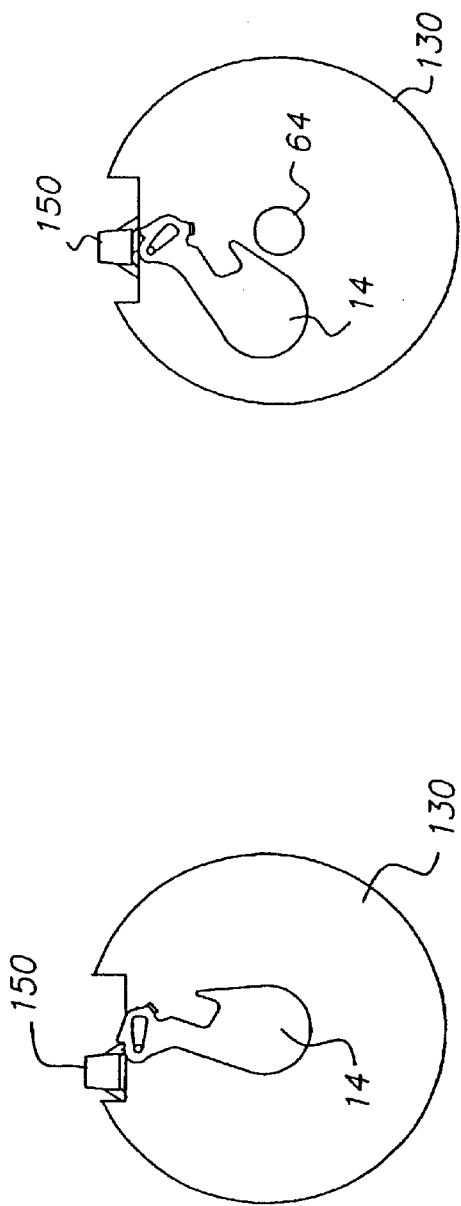
FIG. 25
FIG. 24

CAMERA FRAME ASSEMBLY HAVING FOUR-BAR LINKAGE SHUTTER ACTUATOR

CROSS REFERENCE TO RELATED APPLICATIONS

Reference is made to commonly assigned, co-pending U.S. patent application Ser. No. 10/264,757, entitled: MULTIPLE POSITION LENS BARREL HAVING CAM CYLINDER WITH COMMONLY BIASED FIRST AND SECOND LENS CARRIERS, filed Oct. 4, 2002 in the name of Anthony Dirisio.

Reference is made to commonly assigned, co-pending U.S. patent application Ser. No. 10/324,966, entitled: CAMERA LENS MODULE HAVING RECYCLABLE LENS BARREL CAP, filed Dec. 20, 2002 in the name of Anthony Dirisio.

Reference is made to commonly assigned, co-pending U.S. patent application Ser. No. 10/327,503, entitled: EXTENDABLE LENS CAMERA HAVING MECHANICAL SHUTTER BLOCKING IN INTERMEDIATE LENS POSITIONS, filed Dec. 20, 2002 in the name of Anthony Dirisio.

Reference is made to commonly assigned, co-pending U.S. patent application Ser. No. 10/325,507, entitled: CAMERA FRAME ASSEMBLY HAVING SHUTTER THAT SLIDES FORWARD AND BACK WITH ZOOM LENS, filed Dec. 20, 2002 in the name of Anthony Dirisio, David J. Cornell which is hereby incorporated herein by reference.

Reference is made to commonly assigned, co-pending U.S. patent application Ser. No. 10/325,553, entitled: CAMERA FRAME ASSEMBLY HAVING SHUTTER ACTUATOR WITH TELESCOPING STRIKER AND METHOD, filed Dec. 20, 2002 in the name of David J. Cornell, which is hereby incorporated herein by reference.

Reference is made to commonly assigned, co-pending U.S patent, application Ser. No. 10/326,450, entitled: CAMERA FRAME ASSEMBLY HAVING INDEPENDENTLY BACK-PIVOTING DRIVE HUB FOR IMPACT SHUTTER, filed Dec. 20, 2002 in the name of Anthony Dirisio, which is hereby incorporated herein by reference.

FIELD OF THE INVENTION

The invention relates to photography and cameras and more particularly relates to a camera frame assembly having a four-bar linkage shutter actuator.

BACKGROUND OF THE INVENTION

Many cameras, particularly one-time-use cameras, have single bladed impact shutters. This type of shutter has a shutter blade that pivots about a point offset from an exposure opening. The shutter blade has a first portion that covers an exposure aperture and a second portion, on the other side of the pivot point, that is struck to momentarily open the shutter. The shutter blade is biased closed by a biasing spring. The shutter blade, or a lever connected to the shutter blade, is struck by a fast moving lever, often referred to as a "high energy lever". Some other impact shutters operate in a similar manner, but have more than one blade.

Energy is typically supplied to a high energy lever by one or more springs that are biased (also referred to as "charge") by a film transport mechanism during the advancing of a film frame. After biasing, the high energy lever is latched by another part. The latching is released by the shutter release. The location and operation of a high energy lever in a camera are, thus, constrained by required interactions with other camera components. Many cameras have high energy levers that pivot a lever arm about a center point to impact the shutter. Different parts of the lever arm move at different speeds. This is inconsequential if the lever arm is relatively short, but can be problematic if the lever arm is long. U.S. Pat. Nos. 3,512,466 and 4,595,269 disclose one solution to this problem. In these patents the high energy lever is a flattened plate that has a lower surface that is slid over a camera frame member. The lever arm of the high energy lever translates against the shutter blade to trip the shutter. Sliding parts have a risk of skewing relative to the direction of travel and can be subject to a large amount of friction. Bending can be a risk if weight is reduced to cut inertia.

U.S. Pat. No. 4,725,864 discloses a variable focal length camera which has a main lens system and an auxiliary lens system that can be pivoted into the optical path. The camera has a parallelogramic link mechanism that connects the camera body to a charge lever. The charge lever is slotted. Within the slot rides a pin of a set plate. The set plate and a shutter mechanism move forward and back, relative to the camera body, with other parts of a lens barrel. To charge the shutter, one of the parts of the link mechanism is moved, which moves the charge lever. The set plate is, in turn, moved by the charge lever. The set plate slides on a support and charges a spring that, when released, opens the shutter for picture taking. Another spring closes the shutter when exposure is completed. The charge lever provides the advantage of transferring a movement from the body forward to the variably positioned set plate. On the other hand, the charge lever acts through a sliding set plate and is part of a relatively complex mechanism that also includes both shutter opening and shutter closing springs.

It would thus be desirable to provide a camera frame assembly, which has the low friction advantage of pivoting along with rectilinear movement to impact a shutter.

SUMMARY OF THE INVENTION

The invention is defined by the claims. The invention, in broader aspects, provides a camera frame assembly that has a frame and a pair of tie bars extending outward from the frame. The tie bars each have opposed first and second ends. The first ends are spaced apart. The first ends are each pivotally joined to the frame. A parallel bar is pivotally joined to the second ends of the tie bars. The parallel bar is spaced outward from the frame. The parallel bar is movable, relative to the frame, from a charged position to a discharged position. A striker is movable with the parallel bar between the charged and discharged positions. An impact shutter is movable from a closed position to an open position by the striker.

It is an advantageous effect of the invention that an improved camera frame assembly is provided, which pivots and has rectilinear movement to impact a shutter.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

In FIGS. 1–4, the four-bar linkage is in the charged state and the shutter is in a closed position.

FIG. 2 is a top view of the four-bar linkage and shutter of FIG. 1, modified by the addition of an auxiliary arm. Also shown are a link and synchronization switch.

FIG. 3 is a front view of the four-bar linkage and shutter of FIG. 1. The winding mechanism is also shown.

FIG. 4 is a top view of the four-bar linkage, shutter, and winding mechanism of FIG. 3.

FIG. 21 is an exploded perspective view of the striker of FIG. 19.

FIG. 22 is a semi-diagrammatical front view of the shutter and striker of FIG. 19. A backer is also shown. The striker is in the charged state and the shutter is in the closed position.

FIG. 23 is the same view as FIG. 22, but the striker is transitioning to the discharged state and the shutter is in the partially open position.

FIG. 24 is the same view as FIG. 22, but the striker is further transitioning to the discharged state and the shutter is in the open position.

FIG. 25 is the same view as FIG. 22, but the striker is in the discharged state and the shutter is in the closed position.

DETAILED DESCRIPTION OF THE INVENTION

The camera frame assembly has a shutter actuator that includes a four-bar linkage driver (also referred to herein as a "four-bar linkage") or a telescoping striker or both. The four-bar linkage is used with an extendable lens module or a fixed position lens module. The telescoping striker is used with an extendable lens module. For convenience, the camera frame assembly is generally described herein in relation to an embodiment having an extendable lens module, since fixed position embodiments are encompassed by the lens barrel positions discussed.

Figure 10:
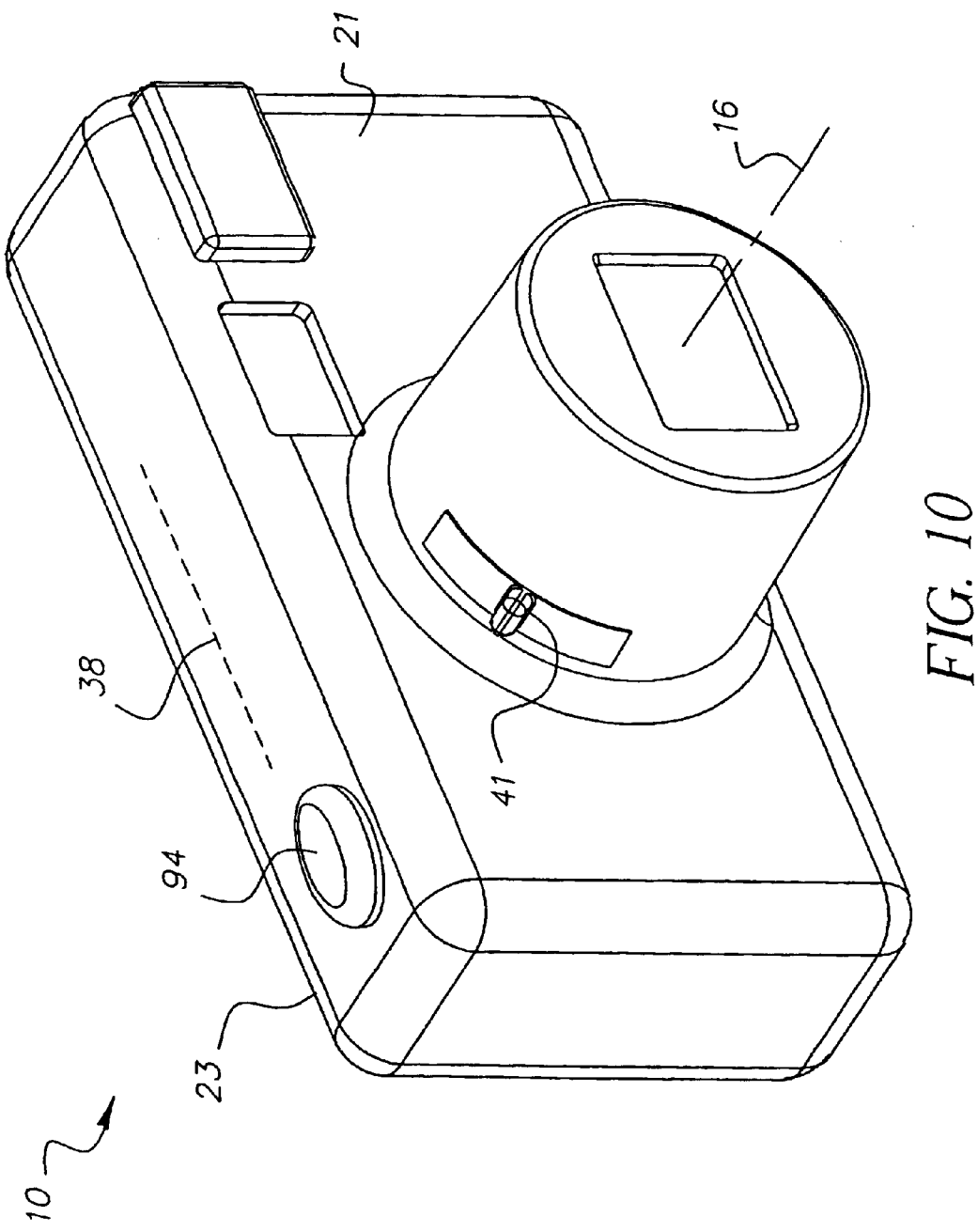
FIG. 10 is a front perspective view of the camera frame assembly of FIG. 1.
Figure 11:
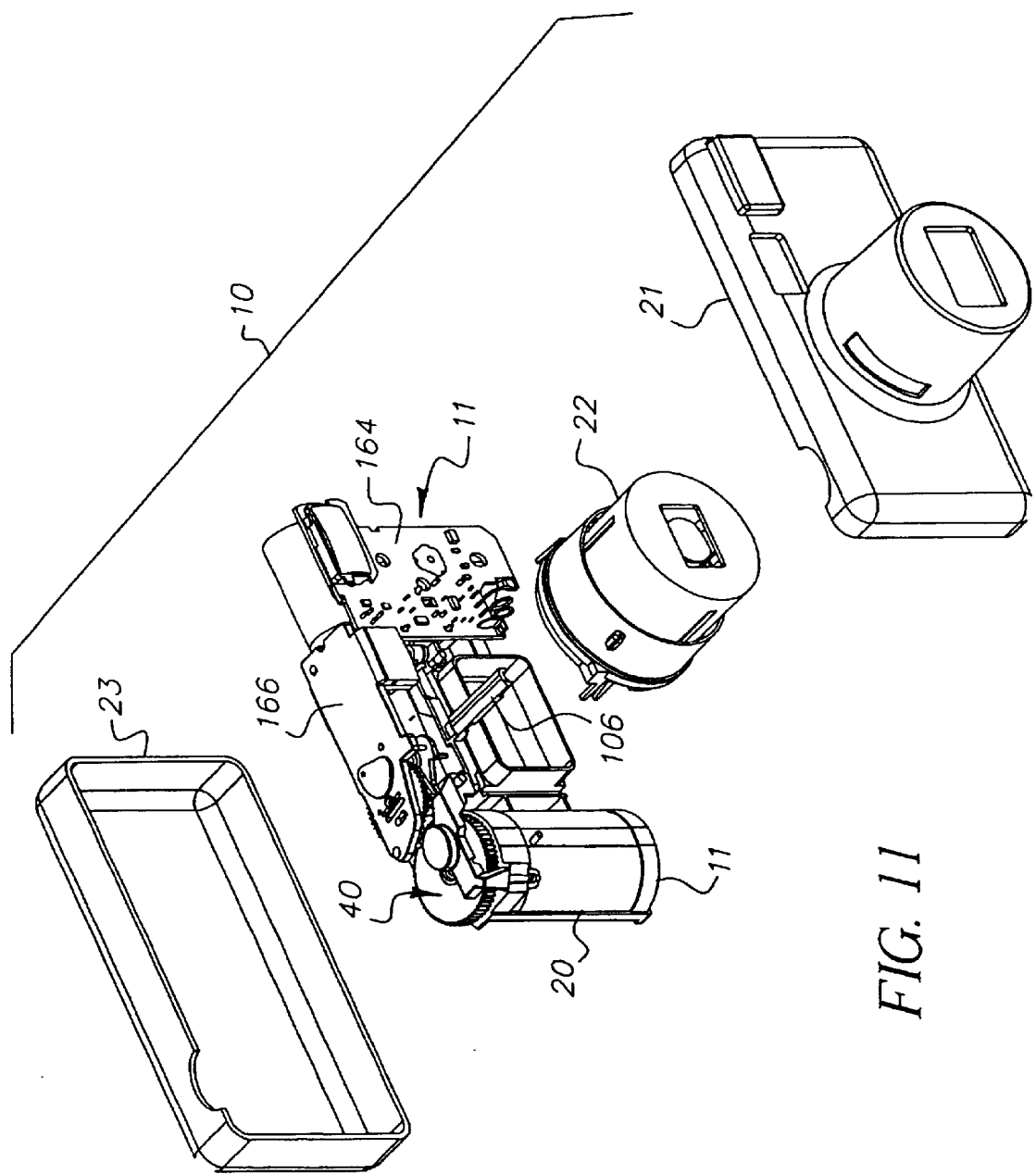
FIG. 11 is a partially exploded, front perspective view of the camera frame assembly of FIG. 10.
Figure 12:
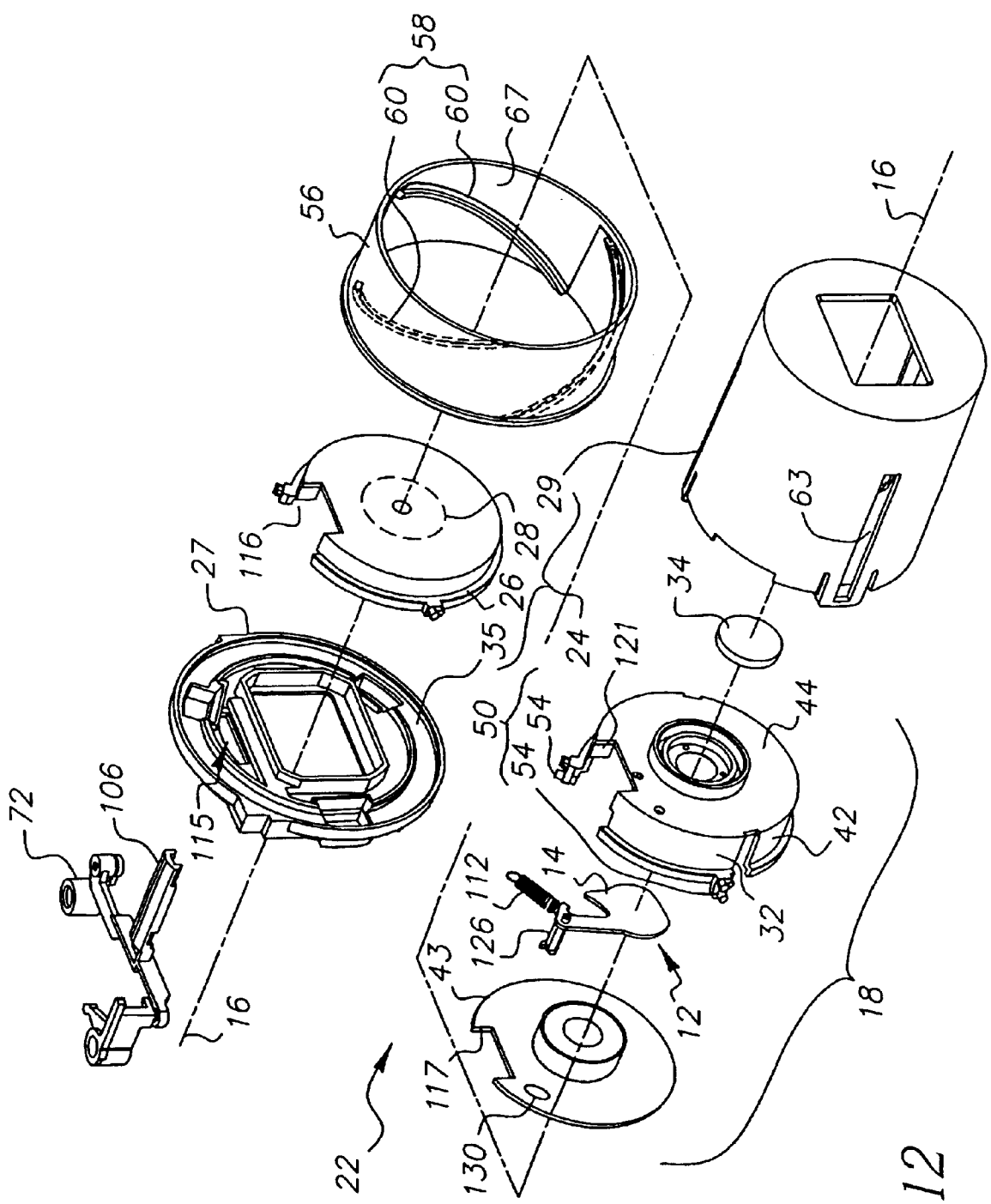
FIG. 12 is an exploded, front perspective view of the lens module of the camera frame assembly of FIG. 10. The knob is not shown.

Referring now particularly to FIGS. 10–12, a camera frame assembly 10 has a lens module 22, which includes a shutter mechanism 12 that has a shutter 14 that moves back and forth along an optical axis 16 with a lens barrel 18. The term "camera frame assembly" is used here to refer to a complete camera or an incomplete subunit of a camera that can be assembled with other parts to form a complete camera. The term "camera frame assembly" is inclusive of a complete or incomplete one-time use camera.

The camera frame assembly 10 has a frame or base member 20 and a lens module 22 attached to the base member 20. In the embodiments illustrated, the base member 20 is held between front and rear covers 21,23 of the camera frame assembly 10. The base member 20 has a pair of opposed chambers 11, one can hold a film cartridge (not shown) and the other a film roll. A winding mechanism 40 advances film from the film roll, across a capture plane 38 (indicated by a dashed line in FIG. 10), and back into the film cartridge. A flash unit 164 can be included and synchronized with the shutter. A viewfinder-keeper plate 166 holds parts of the winding mechanism 40 on the frame. The flash unit 164 and other components are mounted to the base member 20 or held between the base member 20 and covers 21,23.

The lens module 22 has a lens base 24 that is mounted in a fixed position on the base member 20. C(e term "fixed" and like terms are used herein in the sense of a physical position or relationship that is in immobile and unchanging.) The lens base 24 defines the optical axis 16. In particular embodiments of the invention, the lens base 24 includes a carrier 26 and a base lens element 28 (indicated by dashed line in FIG. 12) and optionally includes one or more additional lens elements (not shown).

In the embodiment shown in FIGS. 10–12, the lens base 24 includes the carrier 26, a mount 27, and a holder-cap 29. The mount 27 joins the lens module 22 to the frame 20 and is configured so meet the requirements of a particular frame design. The mount 27 is fixed to the fame 12. The manner in which the mount 27 and other parts are attached to the frame 20 is not critical. For example, the mount 27 can be attached by a friction fit or by hooks or can be otherwise fastened or adhered or bonded.

Figure 28:
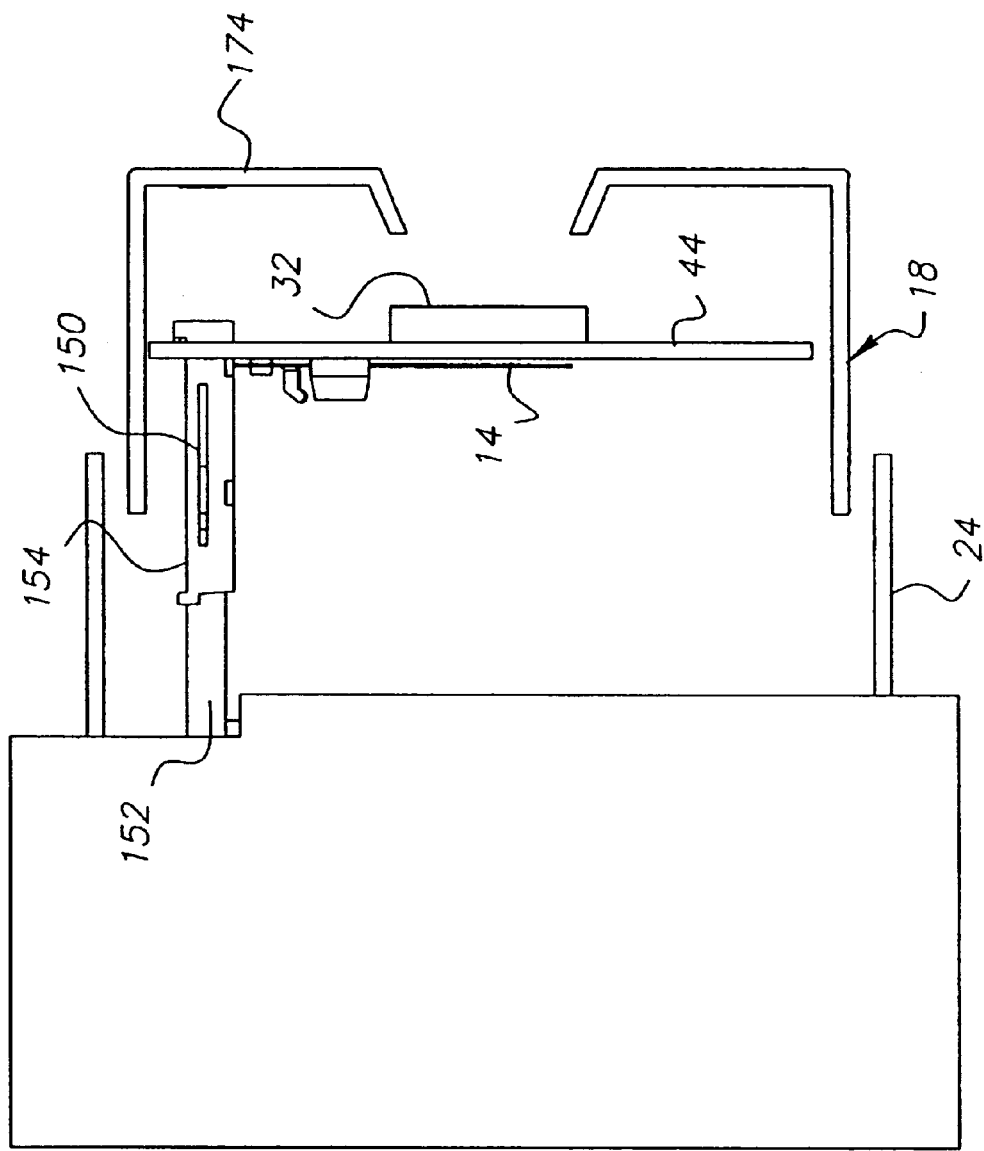
FIG. 28 is a semi-diagrammatical side view of another embodiment of the camera frame assembly. The telescoping striker is in an extended position. The lens barrel is also in an extended position.
Figure 29:
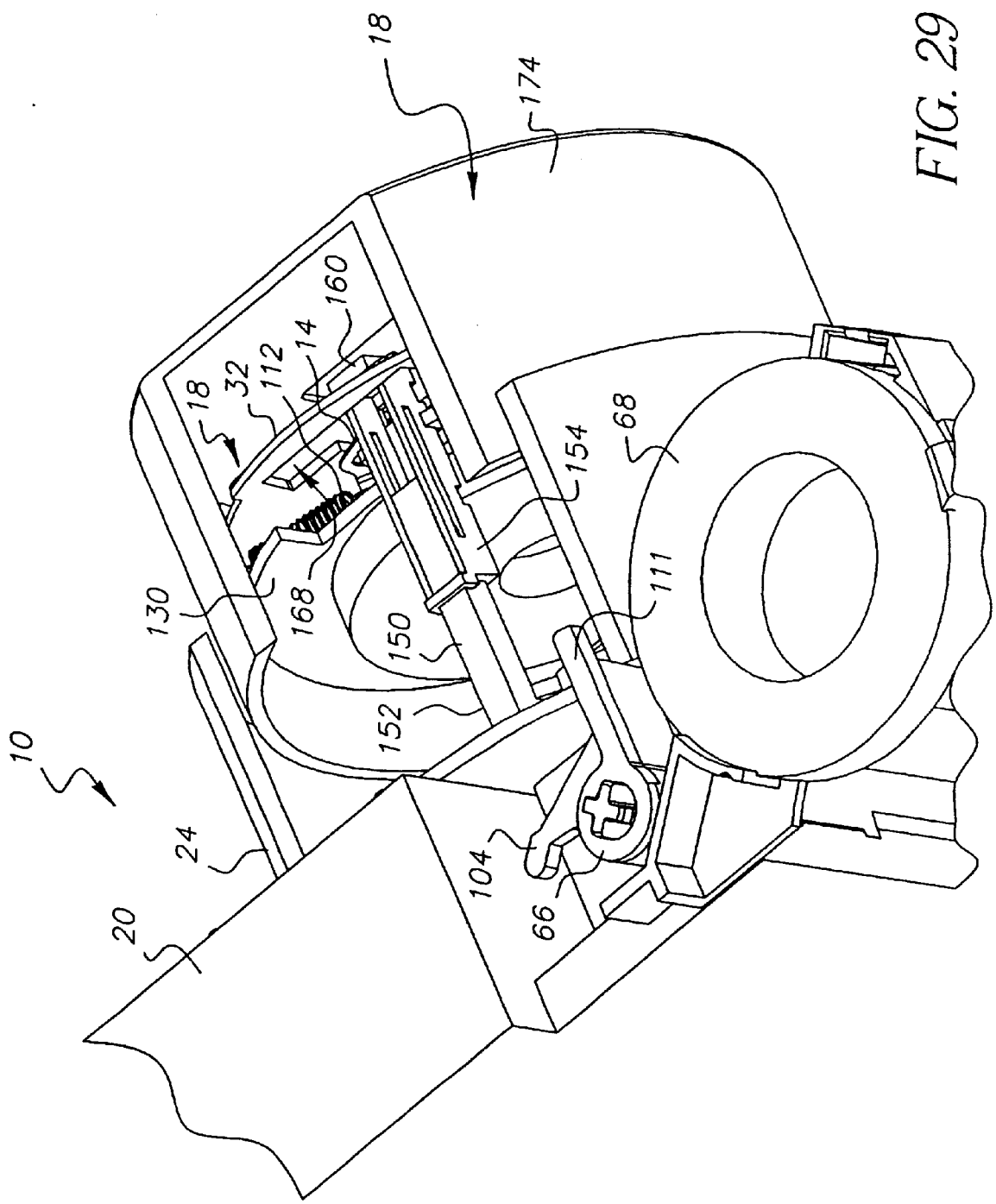
FIG. 29 is a partially cut-away, partial top perspective view of the camera frame assembly of FIG. 28. The telescoping striker and lens barrel are in respective extended positions.
Figure 30:
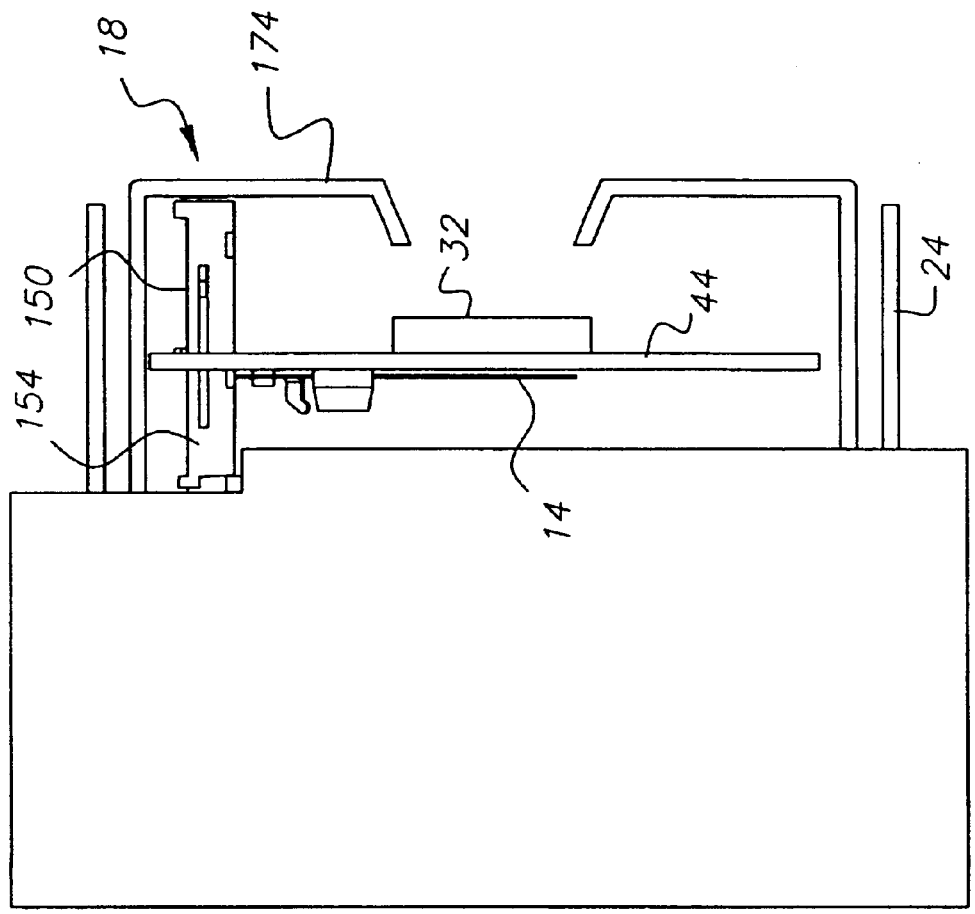
FIG. 30 is the same view as FIG. 28, but the striker and lens barrel are in respective retracted positions.
Figure 31:
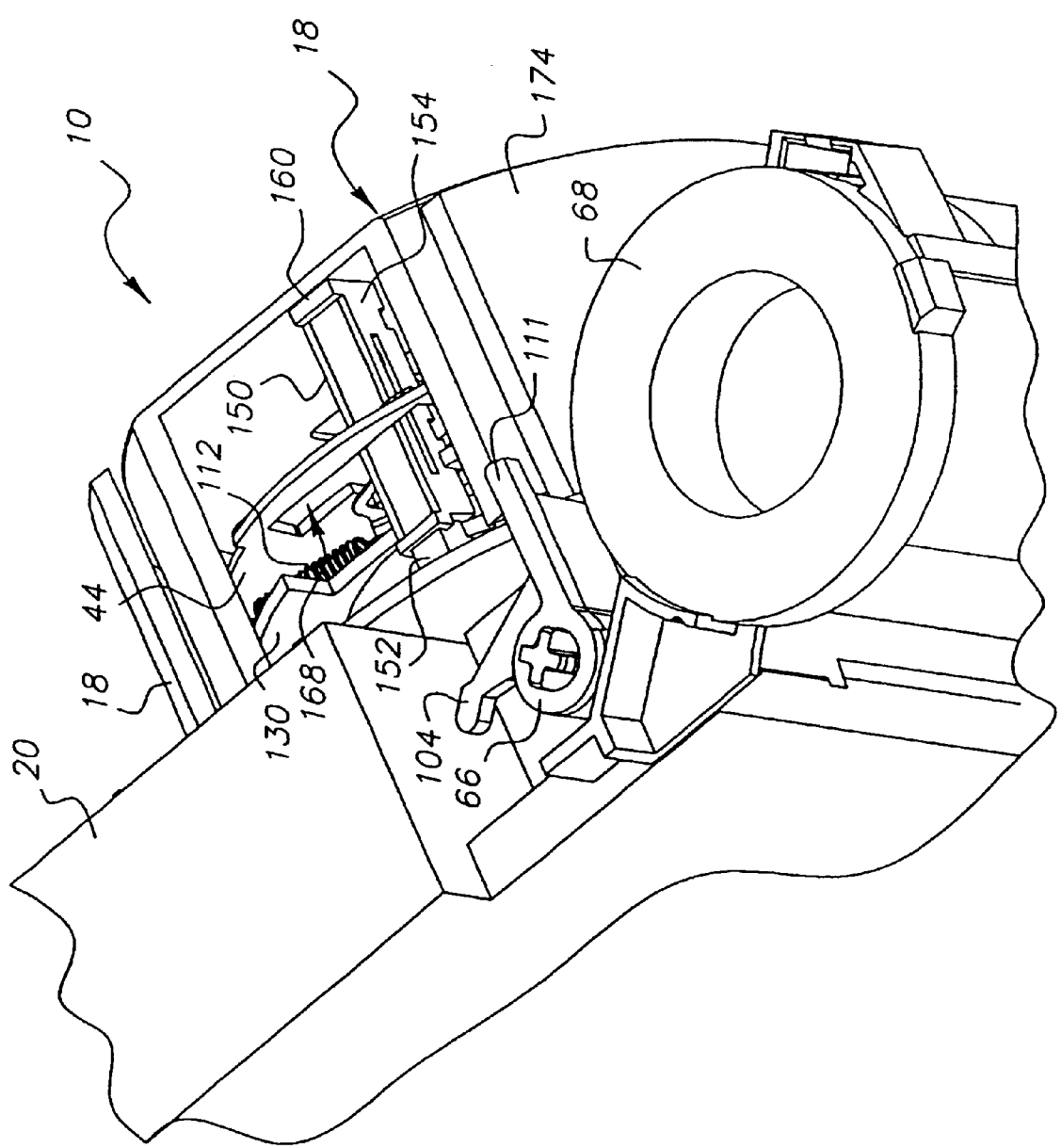
FIG. 31 is the same view as FIG. 29, but the striker and lens barrel are in respective retracted positions.
Figure 32:
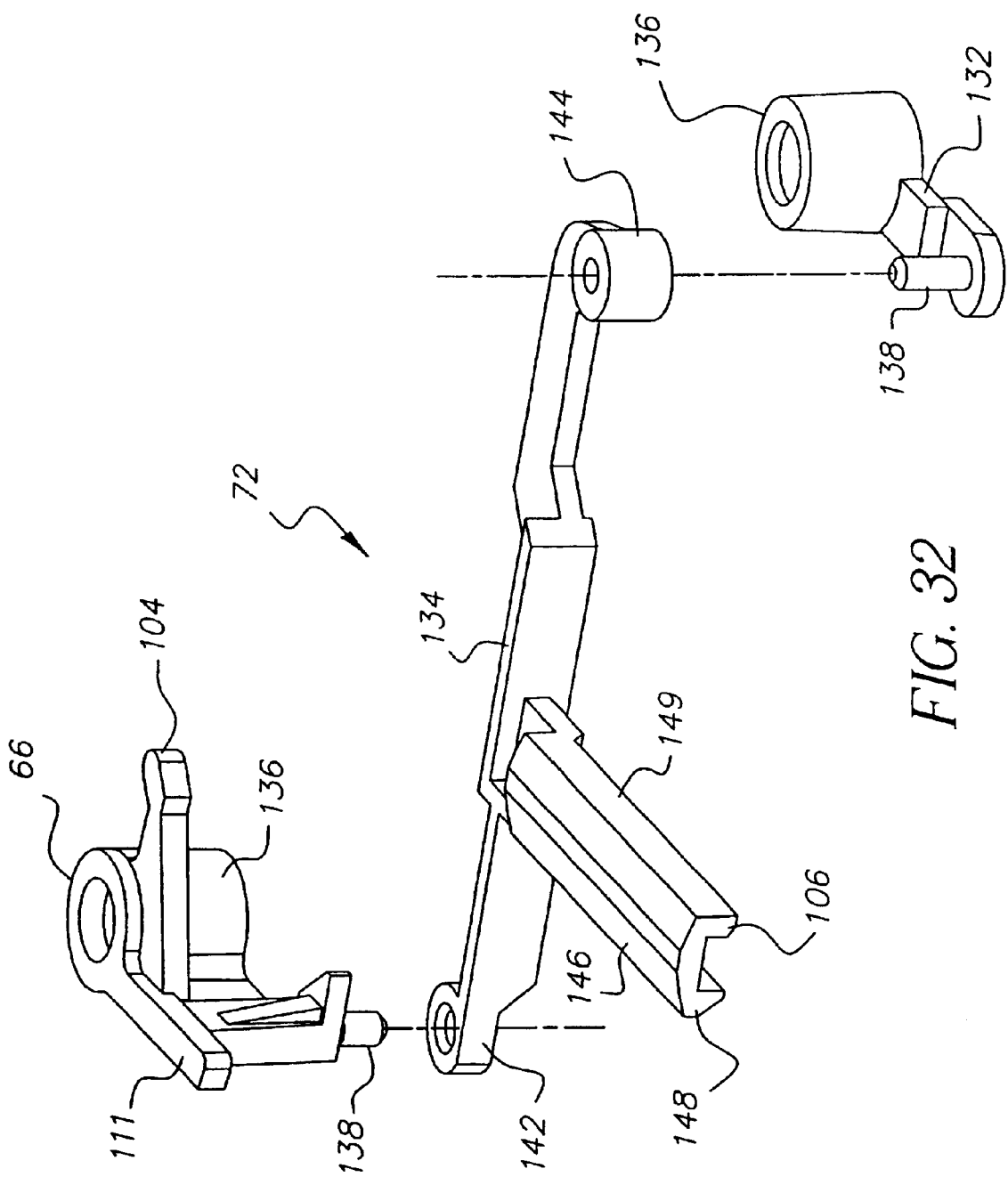
FIG. 32 is an exploded perspective view of the four-bar linkage of FIG. 1.

The mount 27 has a forward-facing cup 35 that receives the holder-cap 29. A central opening 37 of the mount 27 can be bordered by a masking structure 39 that blocks unwanted light, so reducing flare. The holder-cap 29 is snapped, adhered, or otherwise fastened in fixed relation to the mount 27. The holder-cap 29 covers the lens barrel 18 such that the lens barrel 18 extends and retracts within the holder-cap 29. In this embodiment, the front cover covers the base member 20 and the lens module 22. This embodiment can be modified to have the lens module 22 extend and retract through an opening in the cover, in the manner illustrated in semi-diagrammatical form in FIGS. 28 and 30. In that case the holder-cap 29 is replaced by a holder (not shown) that is like the rear portion of the holder-cap. The lens barrel then extends out of and retracts back into the holder. The end of the traveler can be covered by a separate cap (not shown).

The lens barrel 18 is joined to the lens base 24. The lens barrel 18 is movable forward and backward (indicated by double-headed arrow 30) along the optical axis 16 between a fully extended position and a fully retracted position. The movement of the lens barrel 18 may or may not include rotation about the optical axis 16.

The lens barrel 18 includes the traveler 32 and a front lens element 34 held by the traveler 32. The lens barrel can also include a front lens retainer (not shown) to hold the lens in place. Optionally, one or more additional lens elements (not shown) are located within the traveler 32. The front and rear lens elements 34,28 and other lens elements (if any) together comprise a taking lens system that directs light to the capture plane 38. The cameras are described herein in relation to embodiments having photographic film as capture media. An electronic imager (not shown) can be substituted for the photographic film.

In the illustrated embodiments, the traveler 32 has a cylindrical outside wall 42 and a cross wall 44 extending in a direction perpendicular to the optical axis 16. The cross wall 44 has a central opening and supports a front lens element 34. The shutter 14 is held between the cross wall 44 and a backer 43 that is joined to the outside wall 42 of the traveler 32. The backer 43 can be press fit or adhered or attached by fasteners or the like.

A twist ring 56 is mounted on the lens base 24. The twist ring 56 extends at least part of the way around the lens base 24. The twist ring 56 is reversibly rotatable relative to the lens base 24 from a rightward configuration through a plurality of intermediate configurations to a leftward configuration. (As with other directional terms herein, the terms "rightward" and "leftward" are used in a relative sense and are not limiting.) The twist ring 56 is mechanically coupled to the traveler 32, such that rotation of the twist ring 56 between the rightward and leftward configurations moves to the lens barrel 18 between the first and second positions, respectively. The twist ring 56 is trapped in place axially by a knob 41 or a feature (not shown) of the front cover or the holder-cap.

The traveler 32 includes a connector 50 that along with parts of the lens base 24 and twist ring 56 provides an extension-retraction mechanism. The connector 50 has three track followers 54. The track followers 54 can be equally spaced about the traveler 32 to help prevent the traveler 32 from canting relative to the lens base 24. Each track follower 54 has a pair of spaced apart posts. The twist ring 56 has an engagement portion 58 that receives the connector 50 of the traveler 32 and constrains of the traveler 32 such that the traveler 32 moves forward and backward along the optical axis 16 when the twist ring 56 is rotated between the rightward and leftward configurations. The engagement portion 58 is a set of internal tracks 60 that each receive one of the track followers 54 of the traveler 32. In the embodiments illustrated herein, the tracks 60 are spiral ribs that extend toward the optical axis from the circumferential wall 67 of the twist ring 56. The tracks 60 are gripped between the posts of the respective track followers 54. Alternatively, tracks 60 can be grooves or pairs of parallel fences that receive track followers 54 configured to ride in the grooves or between the fences.

The track followers 54 extend to the tracks 60 through corresponding slots 63 in the holder-cap 29 of the lens base 24. The slots 63 each extend parallel to the optical axis 16. In the illustrated embodiments, there are three slots 63 and three corresponding track followers 54.

The track followers 54 slide along the tracks 60 when the twist ring 56 is rotated. Since the track followers 54 are held by the slots 63 of the lens base 24, this results in the lens barrel 18 traversing linearly inward or outward along the optical axis 16. After movement, the traveler 32 is held in a selected position by friction.

The engagement portion 58 and corresponding connector 50 can also be changed. For example, the engagement portion 58 and connector 50 can be meshed gears or the equivalent. Other mechanisms for retracting and extending a lens barrel using a twist ring are known to those of skill in the art.

The lens barrel movement is manually powered by the user rotating the twist ring 56. Referring to FIG. 10, the twist ring 56 includes a knob 41 that protrudes through a slot 73 in the front cover 21. The knob 41 is moved by the user to rotate the twist ring 56. The lens barrel 18 can be operated manually in another manner and, alternatively, can be powered rather than being operated manually.

The carrier 26 has pegs 53 that extend outward in the same manner as the track followers 54 of the traveler 32. The pegs 53 are trapped within respective slots 63 of the holder 43 rearward of respective track followers 54. Three pegs 53 are provided on the same basis as the three track followers 54 of the traveler 32.

The shutter mechanism 12 is opened to direct light through a taking lens system to the capture plane 38. The figures illustrate a photographic film type camera, but the camera can use an electronic imager rather than photographic film for archival capture of images.

The shutter mechanism 12 includes a shutter release 62 that is mounted to the frame 20 and an impact shutter 14 that is disposed in the traveler 32. The shutter 14 is generally described herein in terms of a single blade, but a system of multiple blades can be substituted for the single blade, if desired. The shutter 14 moves forward and back along the optical axis 16 with the traveler 32. The shutter 14 is normally in a closed state in which the shutter 14 tightly covers an aperture 64 in the cross wall 44 of the traveler 32.

The shutter 14 is driven by the shutter actuator. Depending upon the embodiment, the shutter actuator includes a four-bar linkage driver 72 with or without a telescoping striker 150 or is a shutter driver 78 (sometimes referred to as a "high energy lever") having a telescoping striker 74. The following initially describes a shutter mechanism having a four-bar linkage without a telescoping striker.

Referring to FIGS. 1–9 and 11, the shutter actuator 71 is charged by the winding mechanism 40 to a charged state.

The winding mechanism 40 includes a combined thumbwheel and metering wheel 68 that is mounted for rotation adjacent a top corner of the frame 20. A portion of the wheel 68 extends beyond the rear cover 23 and is accessible to the camera operator. If desired, rather than being driven directly by the user, the wheel 68 can be driven by a winding knob, lever, electric motor or other like device.

Photographic film 70 is initially wound in a coil (not shown) in a first film chamber 11 and extends across the capture plane 38 to a second film chamber 11, in which an end of the film is held by the spool 75 of a film cartridge 76. The wheel 68 has a key that couples the wheel 68 to the film cartridge spool 75, such that forward rotation of the wheel 68 causes the film to be wound into the cartridge 76 and advanced past the capture plane 38. An anti-backup pawl 77 is resiliently biased against an edge of the wheel 68 to prevent rotation in a reverse direction.

A film metering sprocket 80 has a sprocket shaft 81 that is pivotably supported by the frame 20. The sprocket 80 engages perforations in the film 70 and is rotated through a complete revolution each time the film 70 is advanced by a distance corresponding to one film frame.

An actuator disk 82 and a charging cam 84 are made in one piece with an axle 79 of the sprocket 80 or are assembled with the sprocket 80 so as to remain in fixed (immobile) relation. The actuator disk 82 has a otherwise continuous circumference interrupted by a notch 85. The charging cam 84 has a spiral surface on one side and a spiral surface on the other side.

A film metering lever 86 and a driven tie bar 66 are supported for pivotal movement by the frame 20. (The metering lever 86 and an driven tie bar 66 are illustrated as having empty, cylindrical cores that can receive upwardly extending posts provided on the frame 20. The metering lever 86 and driven tie bar 66 can instead have shafts that fit in holes in the frame 20 and keeper plate 166.) The metering lever 86 is biased by a coil spring 88 in an activating direction. The metering lever 86 has a first arm 90 ending in a tooth and a second arm 92 having a pawl. When the toothed arm 90 of the metering lever 86 is received in the notch 85 of the actuator disk 82, the pawl arm 92 of the metering lever 86 engages the toothed rim of the wheel 68 temporarily blocking advancement of the film 70.

The shutter release member 62 includes a shutter button 94 that is located near the cantilevered end of a flexible arm 96 of the shutter release 62. Adjacent the shutter button 94 the arm 96 has a vertical tab that carries a latch member 98.

The driven tie bar 66 is biased by a coil spring 100. The driven tie bar 66 has a tongue 102 that is engaged by the latch member 98 to hold the driven tie bar 66 in a charged position in opposition to the spring 100. The driven tie bar 66 also has a cam follower finger 104 that is positioned so as to engage the charging cam 84.

When the driven tie bar 66 is in the charged state and the camera is in condition to make an exposure, as shown in FIGS. 1–4, the tongue 102 of the driven tie bar 66 is engaged by the latch member 98, which holds the driven tie bar 66 in the charged condition in opposition to the spring 100. Prior to this during film advance, the sprocket 80 has been rotated into a position in which the toothed arm 90 of the metering lever 86 is in the notch 85 of the actuator disk 82. This allows the metering pawl arm 92 to engage the wheel 68 under the influence of the spring 100. The cam follower finger 104 of the driven tie bar 66 is out of contact with the charging cam 84.

When the photographer depresses the shutter button 94 to initiate an exposure, the shutter release 62 is released from a ready state to a released state. The shutter button 94 moves the latch member 98 out of engagement with the tongue 102 of the driven tie bar 66, the driven tie bar 66 is pivoted rapidly by the spring 100 from the charged state to the discharged state.

During this movement of the driven tie bar 66, a protruding striker 106 (non-telescoping in the embodiment of FIG. 1) of the four-bar linkage impacts the tang 108, causing the shutter 14 to rotate about a pivot axis 110 from a closed state to an open state. This moves the shutter 14 away from the aperture 64 exposing a light image on the capture plane 38. The aperture 64 is uncovered momentarily. When the striker 106 moves past the tang 108, the shutter 14 returns to a closed state under the biasing of a shutter return spring 112. Movement of the shutter 14 into the closed position is limited by a stop 113.

Figure 13:
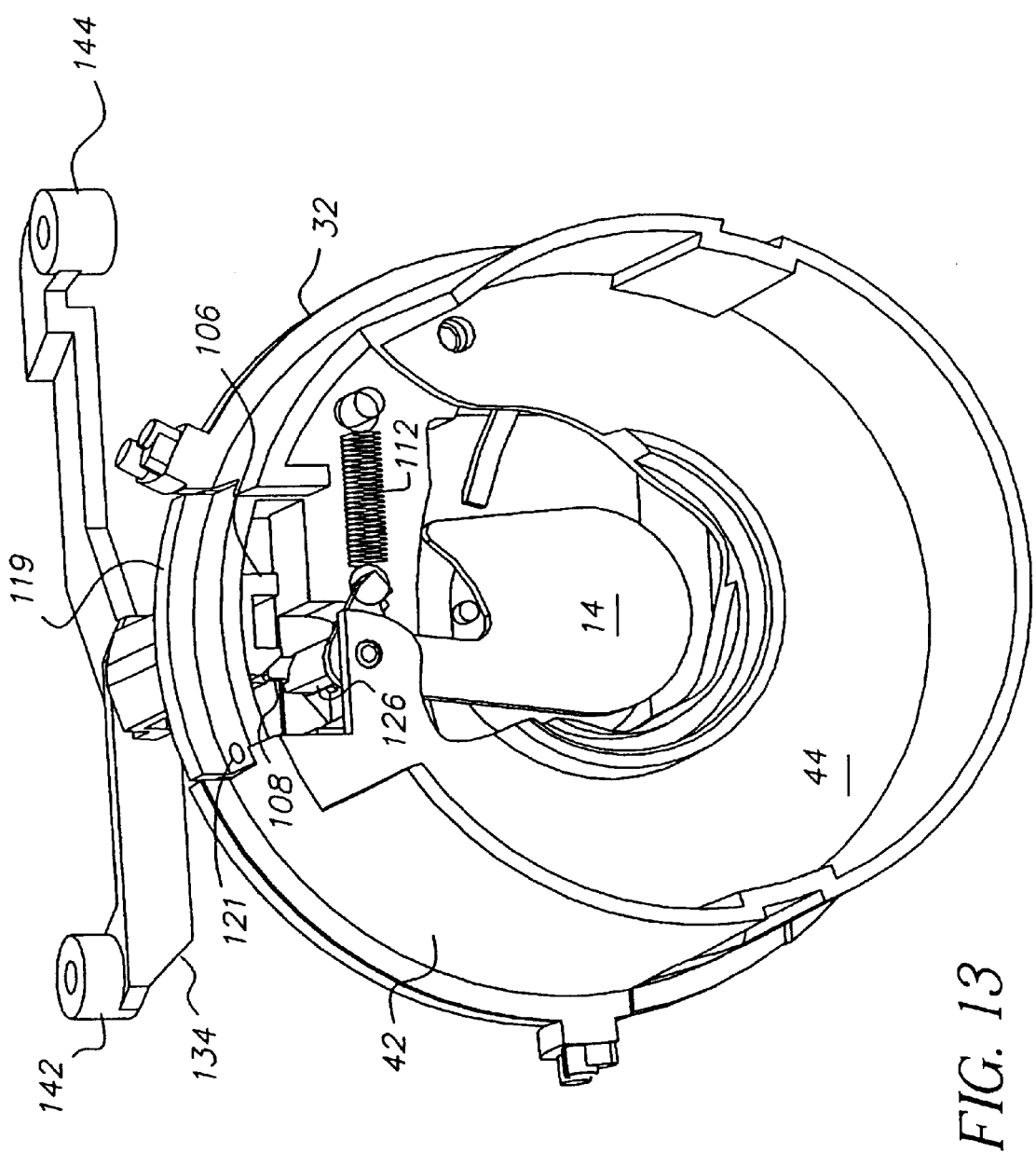
FIG. 13 is a partially cut-away front perspective view of the traveler and part of the four-bar linkage of the camera frame assembly of FIG. 10. The backer shown in this figure is modified by the addition of a guide for the striker.
Figure 15:
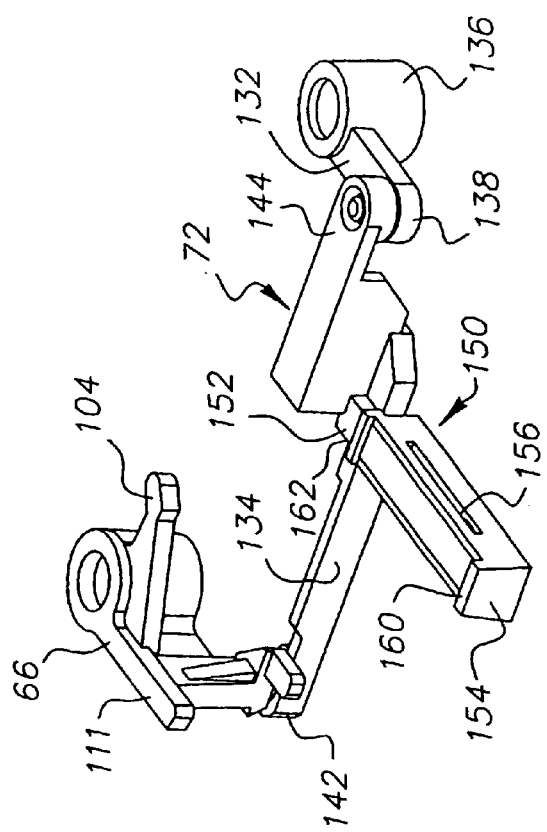
FIG. 15 is the same view as FIG. 14, but the striker is shown in a retracted position.
Figure 14:
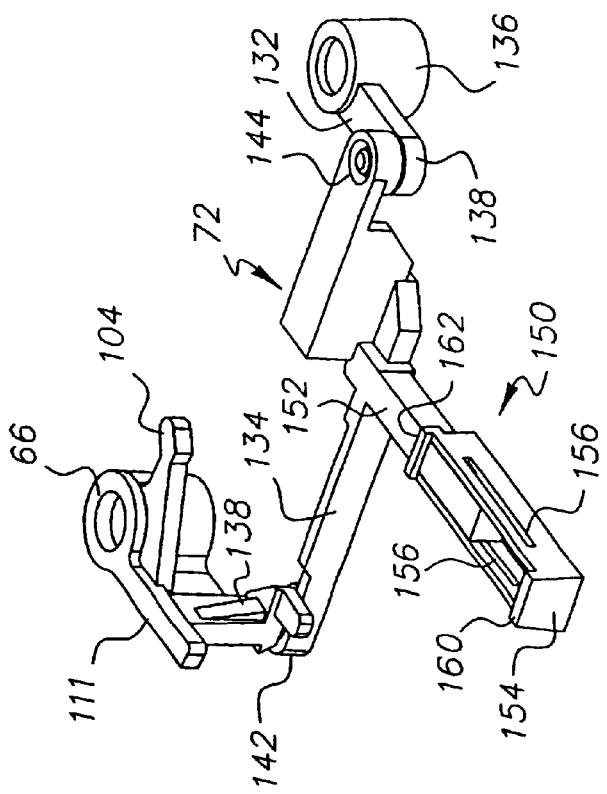
FIG. 14 is a front perspective view of the four-bar linkage of another embodiment of the camera frame assembly. The telescoping striker is shown in an extended position.

The striker 106 moves through aligned gaps 115,116,117 in the mount 27, carrier 26, and backer 43. Referring to FIG. 13, in a particular embodiment, the backer is modified by the addition of a guide 119 for the striker 106. The guide 119 is lodged in a gap 121 in the traveler 32. The guide 119 helps prevent bending of the striker 106. The outside wall 42 of the traveler 32 is lengthened in this embodiment to carry an external cap (not shown).

After the film exposure has been completed, the user releases the shutter button 94. A secondary arm 111 of the driven tie bar 66 moves into engagement with a downwardly extending yoke 114 of the metering lever 86. This causes the metering lever 86 to rotate to a deactivated position, by overpowering the weaker force exerted on the metering member 86 by spring 88. Accordingly, the metering pawl arm 92 is disengaged from the wheel 68 and the metering member tooth arm 90 is retracted from the actuator disc notch 85. This allows the winding mechanism 40 to be operated to advance the film to the next available frame.

When the photographer next rotates the wheel 68 forward, the film is wound onto the spool. This causes the metering sprocket 80 to rotate in the same direction. The charging cam 84 engages the finger of the driven tie bar 66 and rotates the latter back to a charged position.

The shutter 14 has a blocking portion 120 that covers the aperture 64 when the shutter 14 is in a closed state. Joined to the blocking portion 120 is a neck 122 that includes an attachment 118 for the shutter return spring 112. The other end of the shutter return spring 112 is joined to an attachment (not shown) on the cross wall 44 of the traveler 32.

Joined to the neck 122 of the shutter 14, opposite the blocking portion 120, is an extension 124 that extends rearward along the pivot axis 110 parallel to the optical axis 16. The extension 124 is of one-piece with the rest of the shutter or is fixed at one end 126 to the neck 122. A second end 128 of the extension 124 extends through a slotted hole 130 in the backer 43. The tang 108 extends outward relative to the pivot axis 110, at the second end 128 of the extension 124. The shutter 14 can, alternatively, lack the extension 124. In that case, the tang 108 extends outward from the neck 122. FIGS. 22–31 illustrate a shutter 14 of this type, in which the shutter 14 is pivotably connected to the rear of the cross wall 44 and covers an aperture in the cross wall 44. A backer is not present.

During picture taking and recharging, when the driven tie bar 66 moves from the charged state to the discharged state, the striker 106 impacts against the tang 108 causing the shutter 14 to rotate about the pivot axis 110 and move from the closed state to the open state. The shutter return spring 112 is biased by the movement of the shutter 14 from the closed state to the open state. After the striker 106 has cleared the tang 108, the shutter return spring 112 causes the shutter 14 to return to the closed state. The shutter 14 pivots or translates slightly in the slotted hole 130 in the backer 43 to allow return movement of the striker 106 during recharging. The tang 108 can have a portion cutaway to add clearance for movement of the striker 106 past the tang 108 during recharging. In the embodiment of FIGS. 22–31, the shutter 14 has a slotted hole. A pin extends outward from the cross wall 44 and through the slotted hole. During discharging, the shutter 14 pivots about the pin. During recharging, the shutter 14 pivots and/or translates slightly about the pin.

Figure 1:
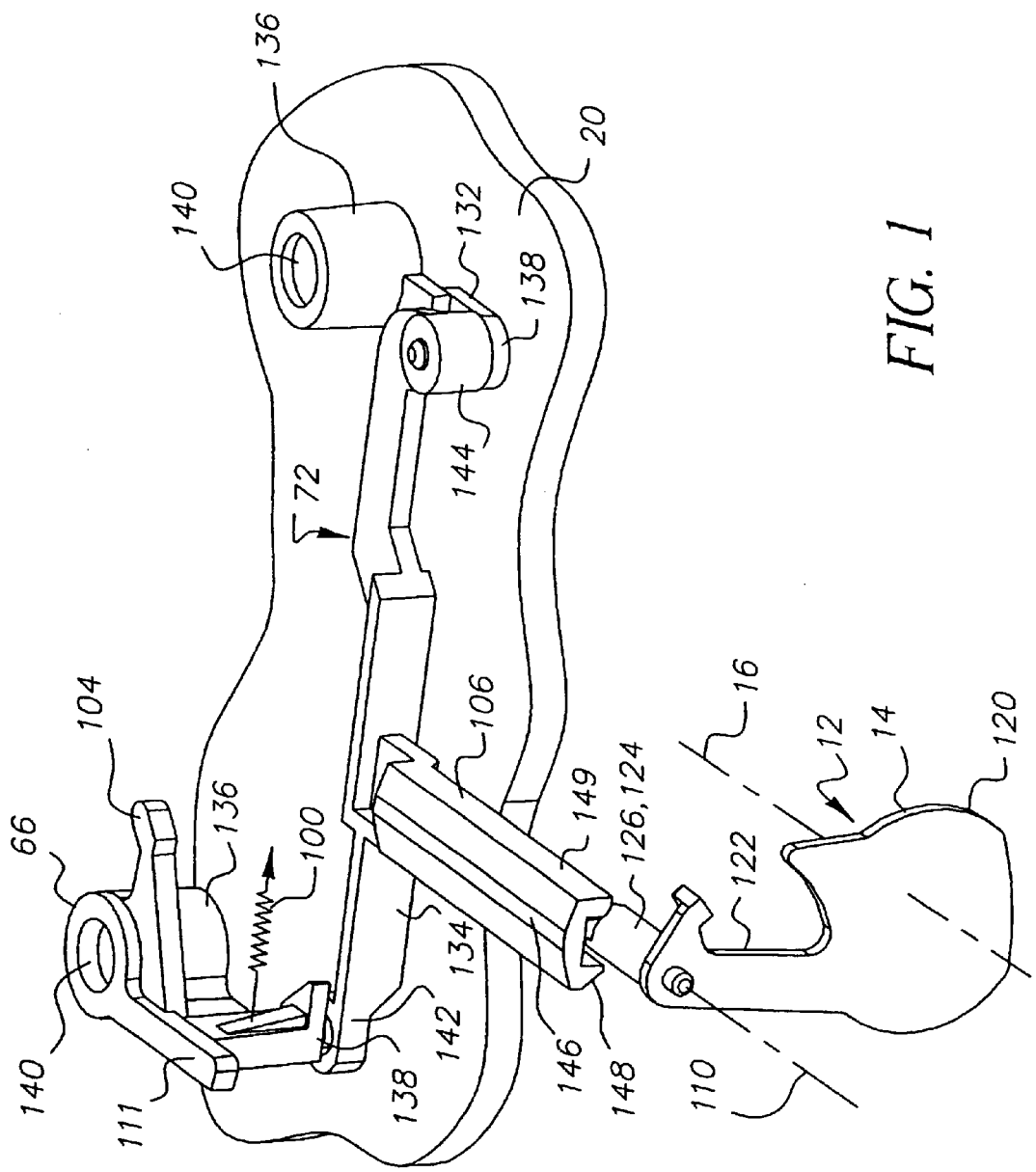
FIG. 1 is a front perspective view of a four-bar linkage and shutter of an embodiment of the camera frame assembly.

Referring now to FIG. 1, a pair of tie bars 66,132 extend outward from the frame 20. The tie bars 66,132 each have opposed first and second ends 136,138. The first ends 136 are spaced apart from each other and are each pivotably joined to the frame 20. A parallel bar 134 is pivotably joined to the second ends of the two tie bars 66,132. The parallel bar 134 is spaced forward from the first ends and, in some embodiments, from the frame 20. A striker 106 is movable with and, preferably, joined to the parallel bar 134.

Figure 2:
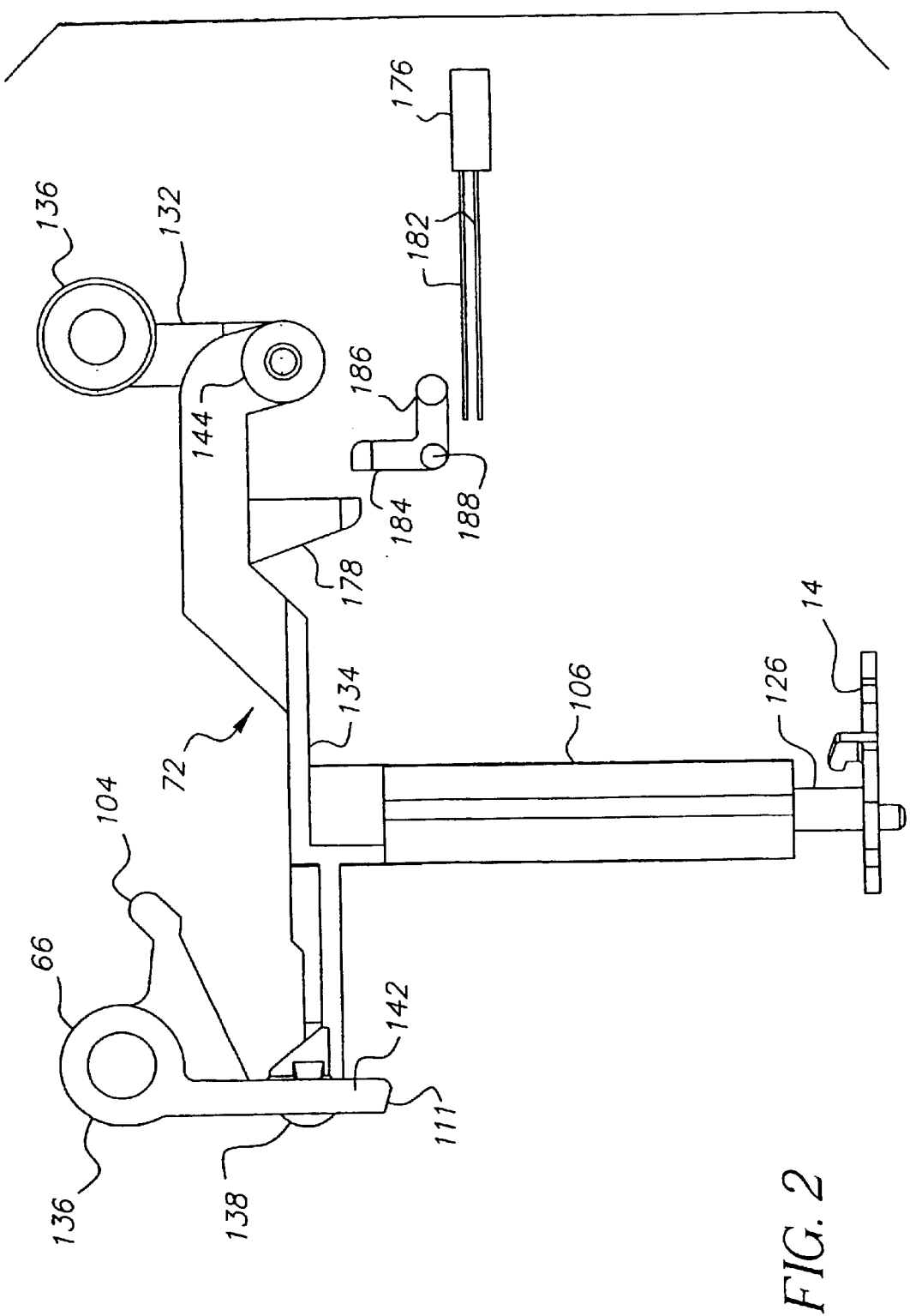
Figure 3:
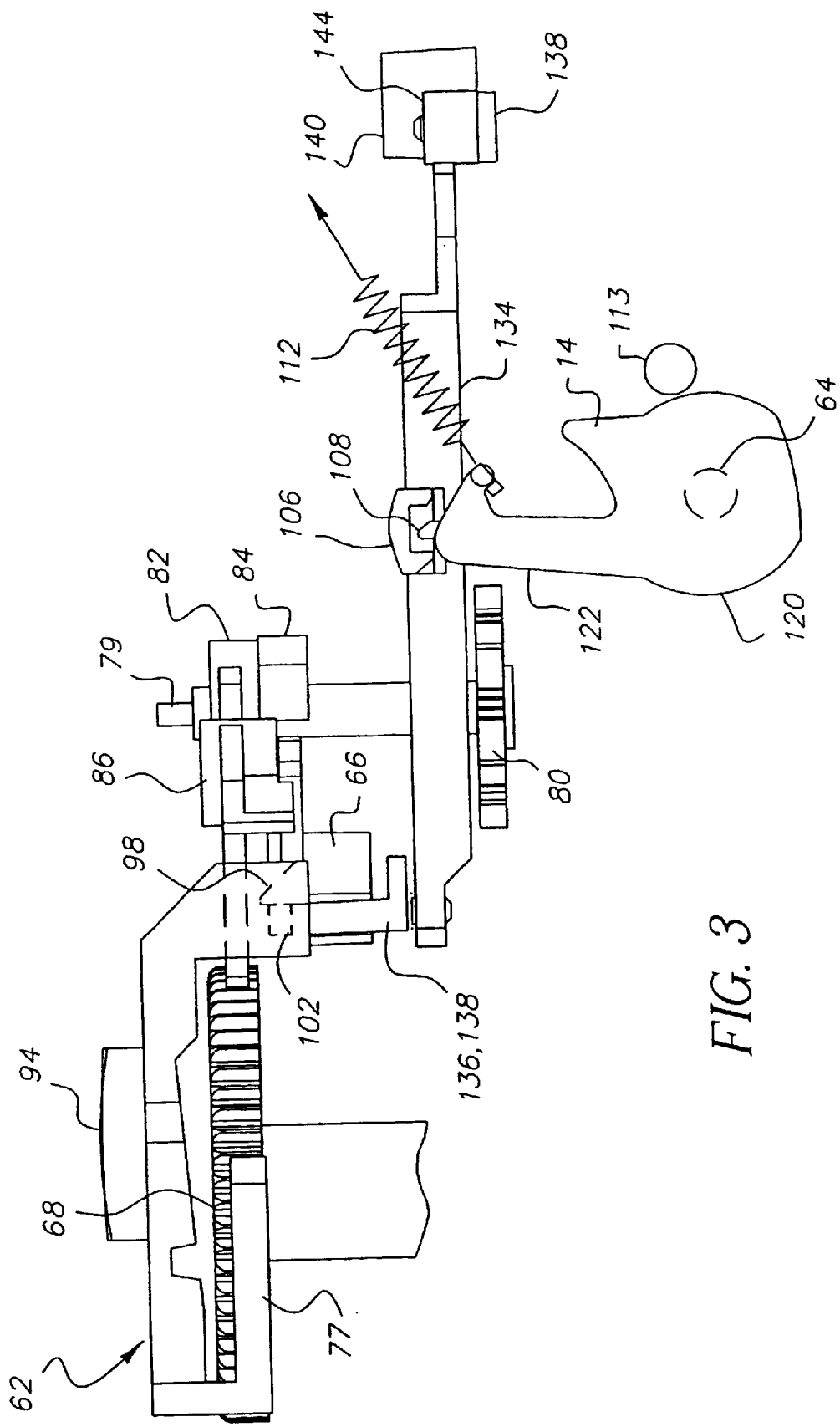
Figure 4:
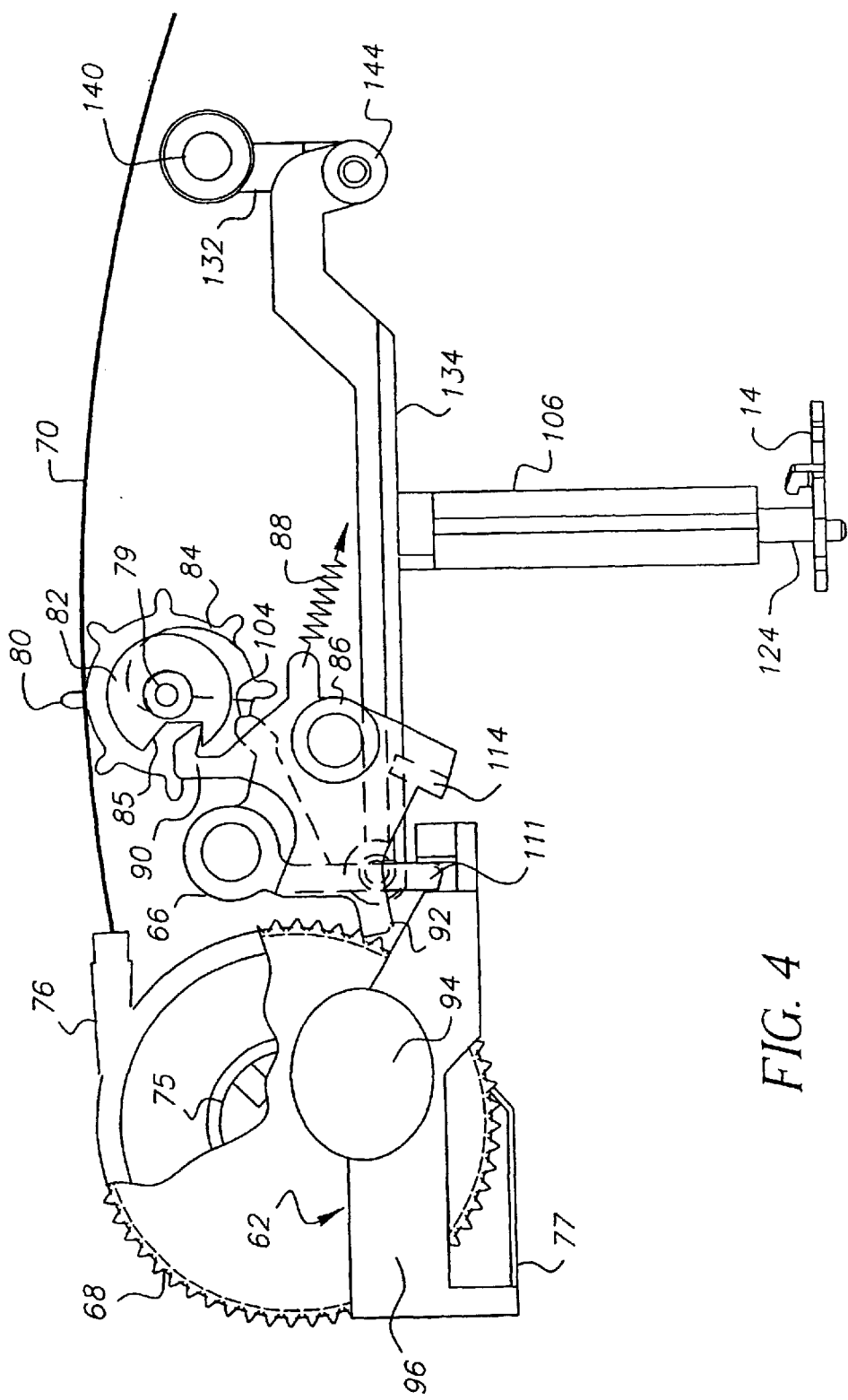
Figure 5:
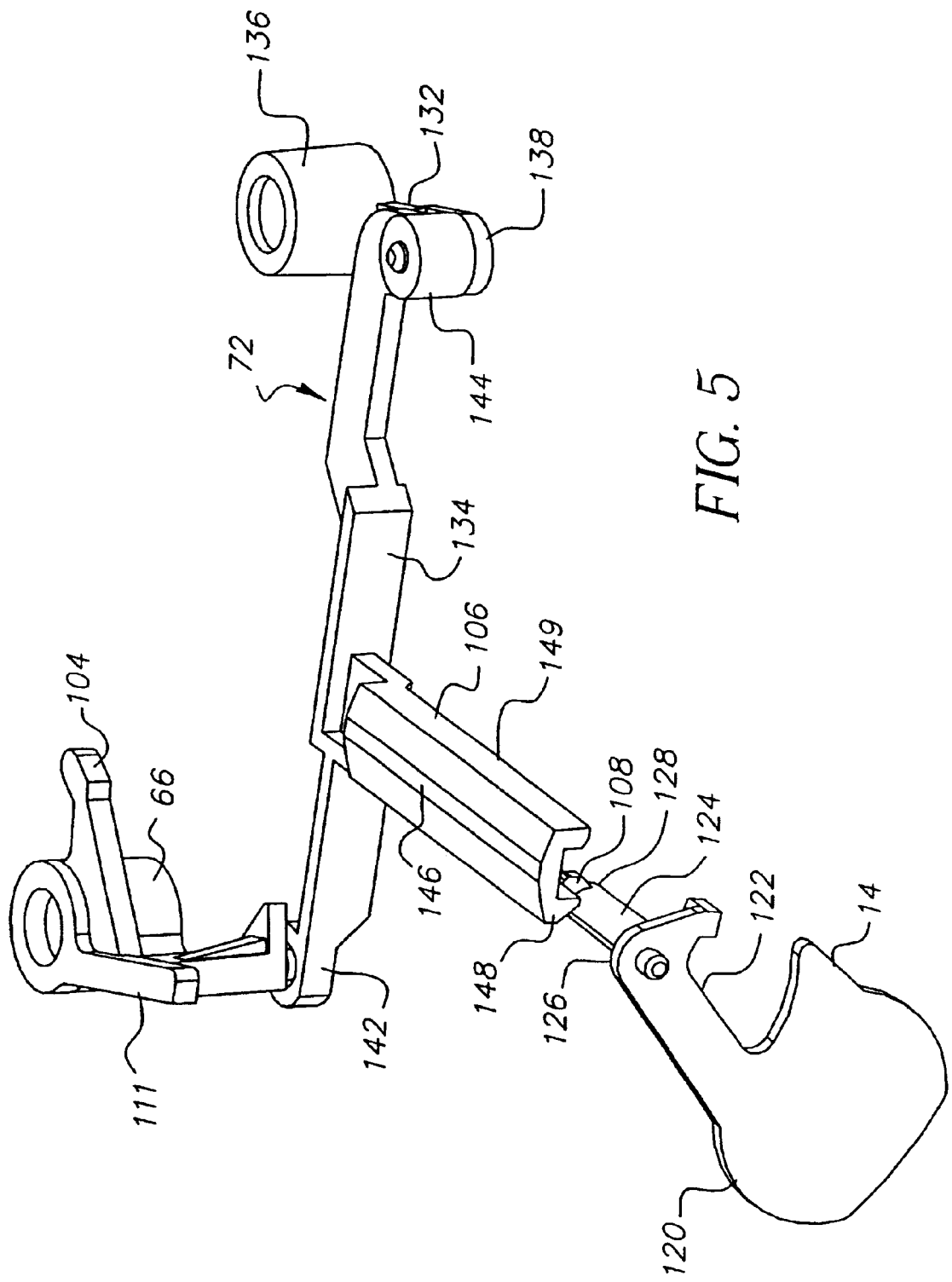
FIG. 5 is the same view as FIG. 1, but the four-bar linkage is in a discharged state and the shutter is in an open position.
Figure 6:
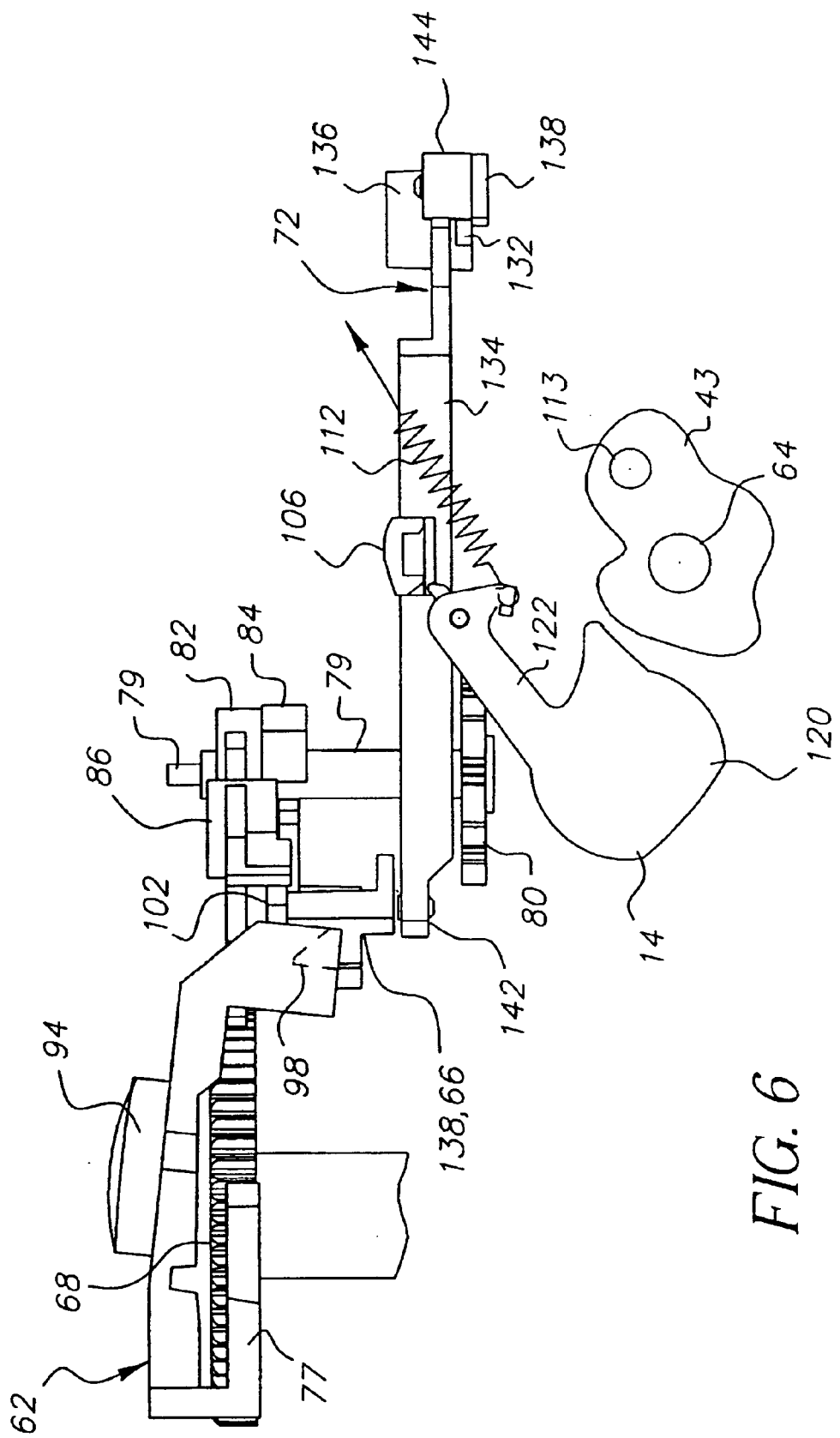
FIG. 6 is the same view as FIG. 3, but the four-bar linkage is transitioning to a discharged state and the shutter is in an open position.
Figure 7:
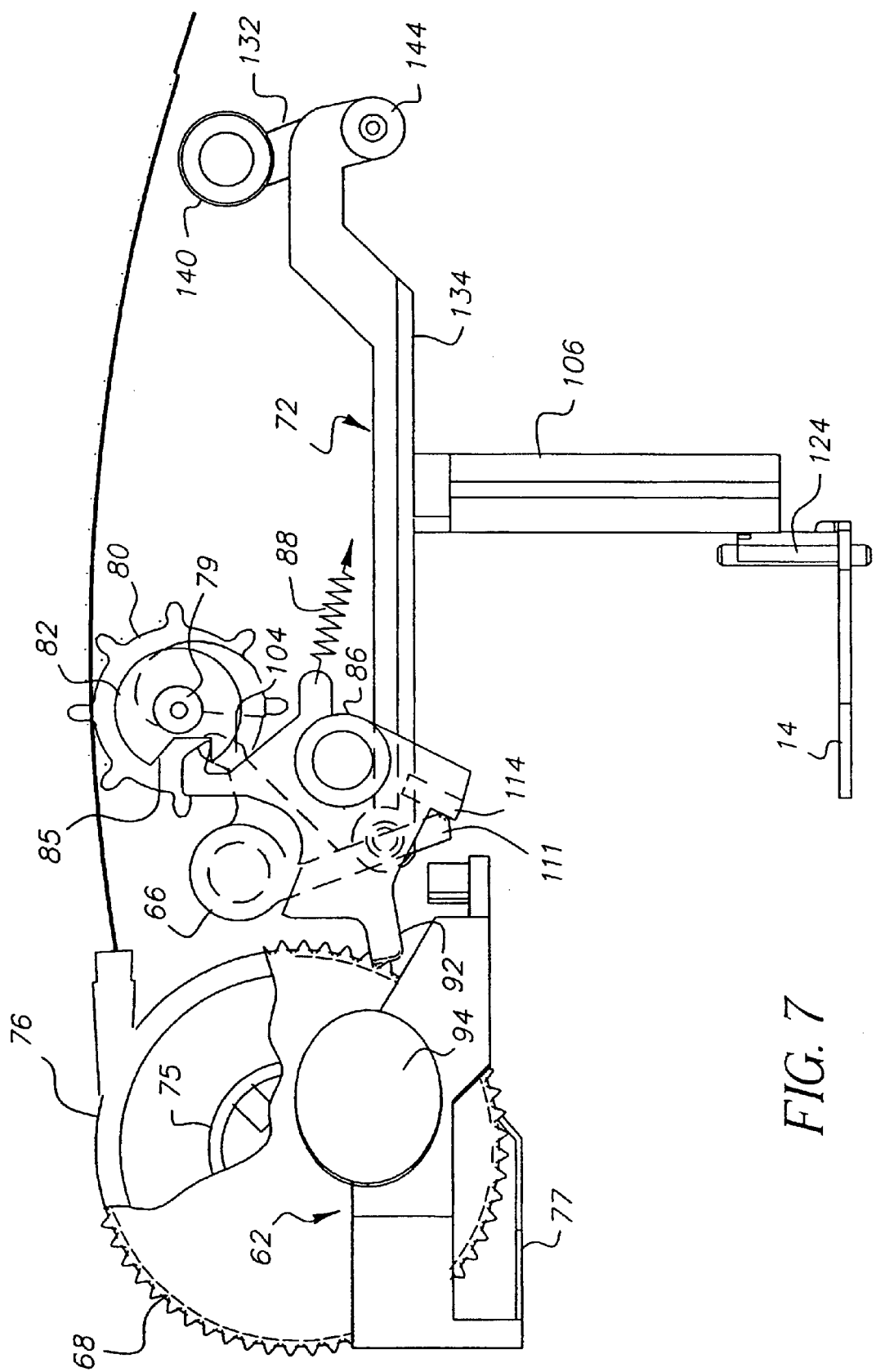
FIG. 7 is the same view as FIG. 4, but the four-bar linkage is transitioning to a discharged state and the shutter is in an open position.
Figure 8:
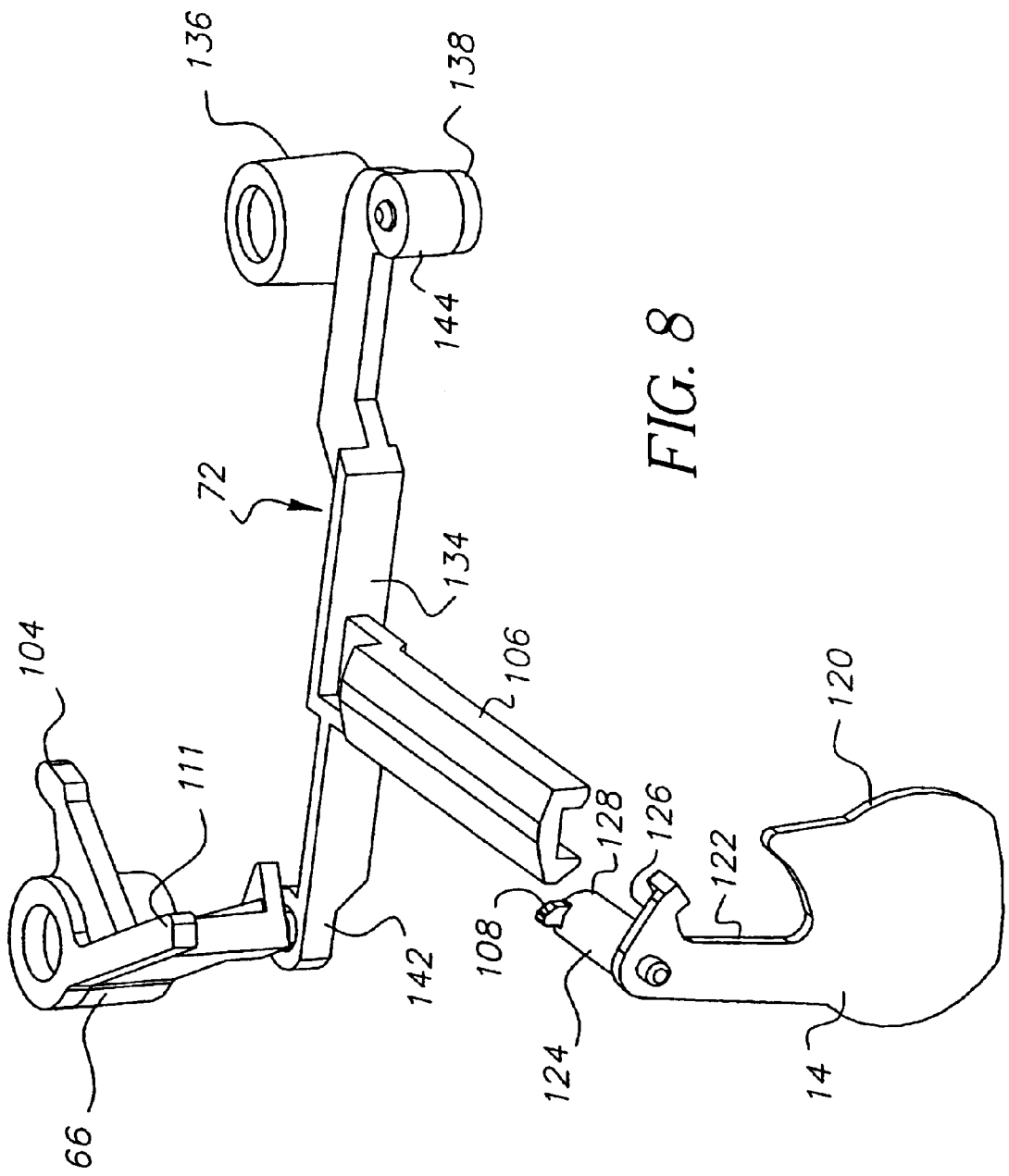
FIG. 8 is the same view as FIG. 1, but the four-bar linkage is in a discharged state and the shutter is in a closed position.
Figure 9:
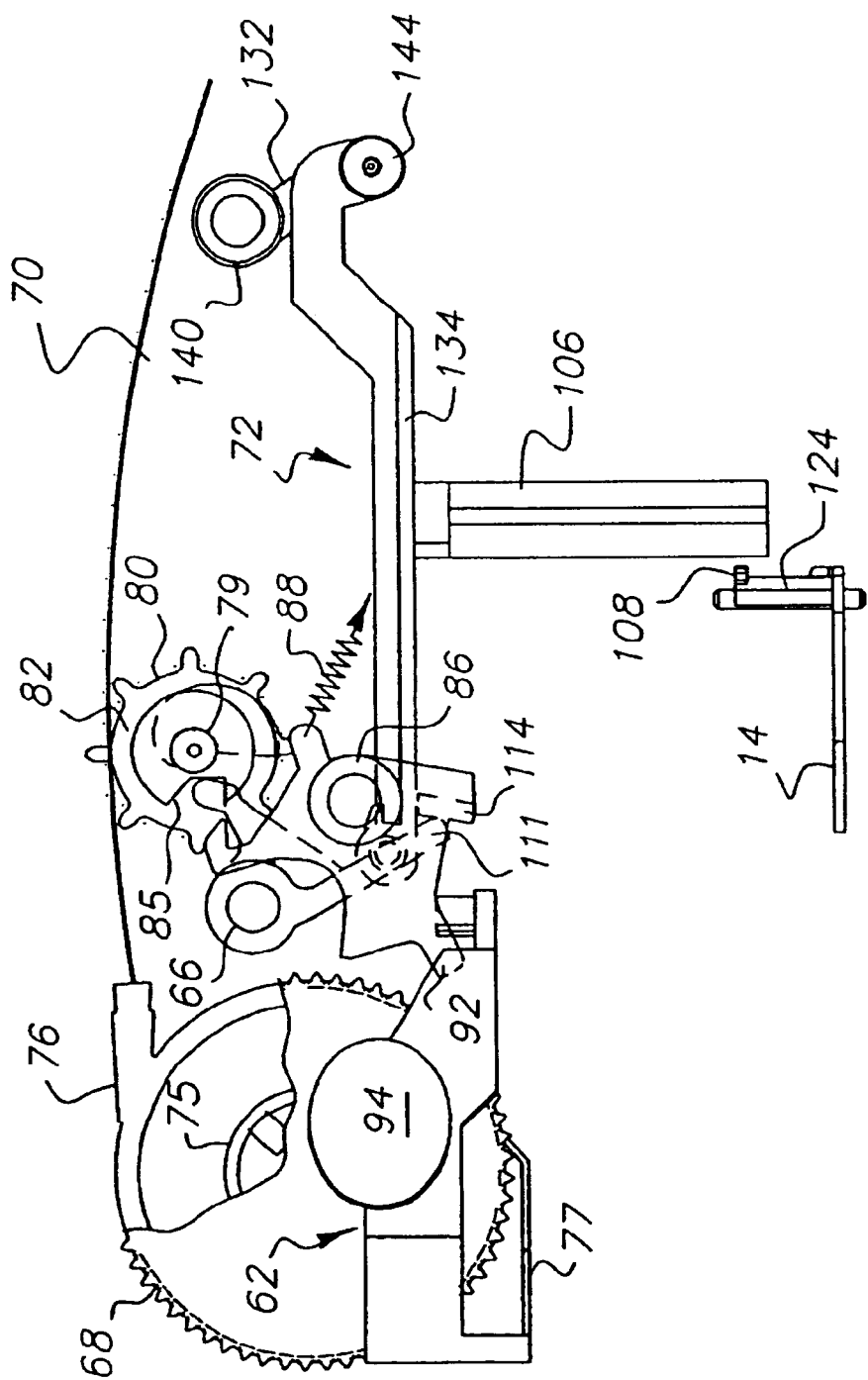
FIG. 9 is the same view as FIG. 4, but the four-bar linkage is in a discharged state and the shutter is in a closed position.

A flash synchronization switch 176 can be operated by the movement of the striker 106 or of any of the bars, 66,132, 134. Referring to FIG. 2, an auxiliary arm 178 can be provided on the parallel bar 134 or one of the other bars. The flash synchronization switch is mounted to the frame 20 parallel to bar 134. The switch 176 has a pair of contacts 182 and an L-shaped link 184 adjoining the contacts 182. The link 184 has a pair of orthogonal arms 186. The link 184 is pivotable about an axis 188 (indicated by a cross in FIG. 2) between the arms 188 from a set position to a tripped position, by the rectilinear movement of the parallel bar from the charged position to the discharged position. The link 184 is returned to the set position by the return movement of the parallel bar, in the opposite direction, from the discharged position to the charged position. The contacts 182 close when the auxiliary arm 178 moves past and are open at other times.

In the embodiment shown, the first ends 136 of the tie bars 66,132 are each sockets that fit on posts 140 of the frame 20. The second ends 138 and ends 142,144 of the parallel bar 134 fit in a similar post and socket arrangement. In the embodiment shown, ends 142,144 of parallel bar 134 provide sockets and the tie bars 66,132 provide posts. The tie bars 66,132 and frame 20 can be modified to interchange the openings and posts or to have other comparable features.

The tie bars 66,132 and parallel bar 134 acts as a parallelogramic linkage (Also referred to as a 4-bar linkage) between the striker 106 and the frame 20. The parallel bar 134 and tie bars 66,132 are able to pivot back and forth. This provides the striker with a rectilinear motion. The movement of the tie bars 666,132 and parallel bar 134 is driven by a transport-charging mechanism that acts on one of the bars 66,132,134. The bar that is acted on can be adapted to meet the requirements of a particular mechanism.

In the embodiment shown in the figures, the driven tie bar 66 is part of the transport-charging mechanism. The driven tie bar 66 takes the place of a conventional high energy lever and moves with bars 132 and 134 and striker 106.

The striker 106 is sufficiently rigid so as to be able to move between the charged and discharged positions without bending. Unlike the parallel bar 134 and tie bars 66,132, the striker 106 is cantilevered, rather than being supported at either end. For this reason, the striker 106 is made more rigid than the bars 66,132,134.

As shown in FIG. 1, the striker 106 can be U-shaped in cross-section to increase rigidity. The striker 106 has a main beam 146 that extends longitudinally outward from the parallel bar 134 and a pair of longitudinally extending flanges 148,149 that extend outward from the main beam 146. The leading flange 149 can be eliminated to reduce weight, if desired.

In the illustrated embodiments, the parallel bar 134 is longer than each of the tie bars 132. The relatively short length of the tie bars 132 reduces the risk of skewing of the bars during movement. In a particular embodiment, the parallel bar 134 and striker 106 are parts of a one-piece polymer casting. This approach is convenient and helps the rigidity of the parts, since there is no joint between the striker and parallel bar.

Figure 18:
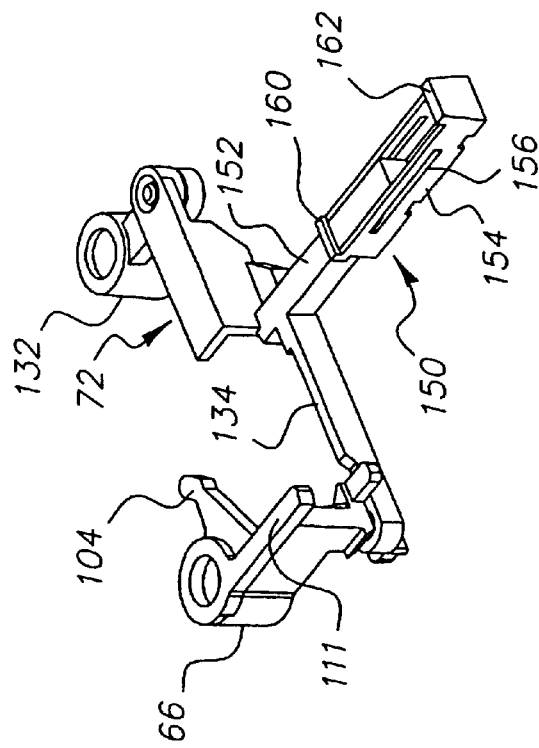
FIG. 18 is a front perspective view of a modification of the four-bar linkage of FIG. 14.

In the embodiment of FIGS. 1–9, the striker 106 is positioned at about the midway point of the parallel bar 134. The 4-bar linkage 72 can be modified to relocate to the striker 106 anywhere along the parallel bar 134 and can step upward or downward in a direction perpendicular to the longest dimension of the parallel bar 134 and to the optical axis. An example of this is illustrated in FIG. 18.

Referring now to FIGS. 14–18, in a particular embodiment a telescoping striker 150 is provided to accommodate additional movement of the shutter along the optical axis. The striker 150 includes a first striker member 152 that is joined in fixed relation to the shutter driver 78, four-bar linkage 72 or other shutter actuator. A second striker member 154 that is supported by the first striker member 152 and is movable relative to the first striker member 152 and the frame in a direction parallel to the optical axis.

The movement of the second striker member 154 is between a retracted position, in which the second striker member 154 is relatively close to the frame 20 and extended position, in which the second striker member 154 is relatively distant from the frame. The shutter actuator, as a whole, is rapidly movable relative to the frame from a charged position to a discharged position so as to strike an impact shutter or otherwise actuate the shutter. The movement of the shutter actuator, from the charged position to the discharged position, can occur when the second striker member 154 is in the retracted position and when the second striker member 154 is in the extended position. In a particular embodiment, the second striker member 154 is capable of assuming a plurality of intermediate positions between the retracted position and the extended position. In that embodiment, the shutter actuator is movable between the charged and discharged positions, when this second striker member 154 is in any of the retracted, intermediate, and extended positions.

The first and second striker members 152,154 are configured, such that the first striker member 152 supports the second striker member 154 for movement between the extended and retracted positions. One of the striker members telescopes onto the other striker member. In the illustrated embodiments, the second striker member 154 telescopes over the first striker member 152. The second striker member can, alternatively, telescope into the first striker member. In both cases, the outer striker member can be tubular, so as to extend fully around the inner striker member in the retracted position. Alternatively, the outer striker member can have one or more walls or portions removed to reduce mass. The inner striker member can be hollow or solid, as needed for strength requirements of a particular use.

More than two telescoping striker members can be provided. The striker members can vary in length, such that one striker member incompletely telescopes over the other or others. For convenience, the telescoping striker is generally described herein in relation to a striker having two telescoping striker members of equal length.

The striker members can be round in cross-section or otherwise shaped so as to permit rotation of the outer striker member about the longitudinal axis of the inner striker member. With the illustrated shutters, such rotation is unnecessary and the outer striker member is blocked by a portion of the inner striker member from rotation about the longitudinal axis of the inner striker member. In illustrated embodiments, the outer striker member 154 has a transverse cross-section that is square or rectangular except where portions of the outer striker member are cut away.

The telescoping striker 150 can include retention features that retain the outer striker member upon the inner striker member. The retention features can also limit the extent of telescoping, if desired. A variety of features can be provided for this purpose. For example, in the illustrated embodiments, the outer striker member 154 has slots 156, which receive a pair of tabs 158 (best seen in FIG. 21) formed on the inner striker member 152. During assembly, the outer striker member 154 is flexed known to admit the tabs 158 into the slots 156.

In the embodiments illustrated, the second striker member 154 is freely movable on the first striker member 152. Alternatively, the second striker member 154 can be frictionally restrained or otherwise biased to prevent unintended movement of the second striker member 154 when the camera is bumped or reoriented.

Figure 26:
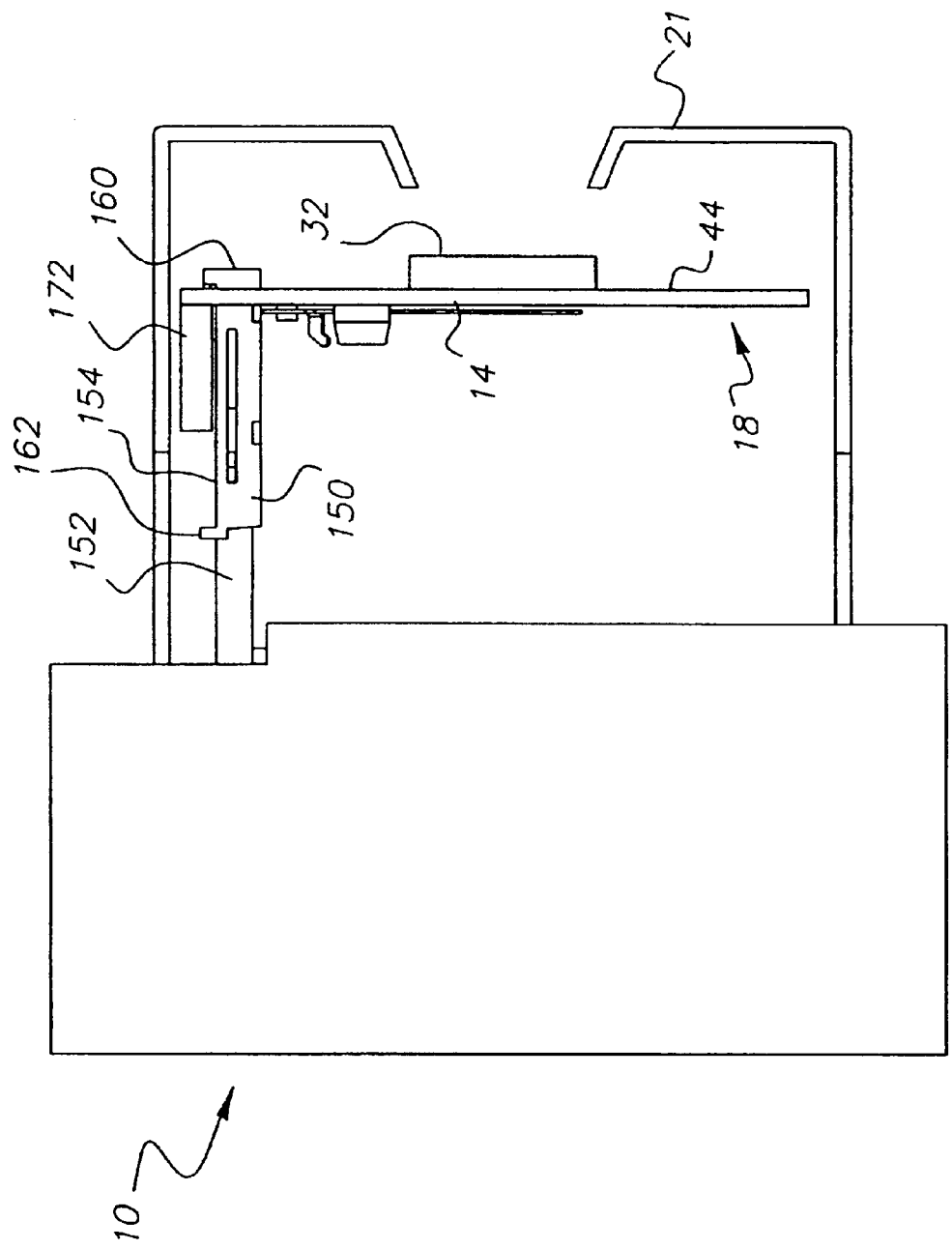
FIG. 26 is a semi-diagrammatical side view of another embodiment of the camera frame assembly. The telescoping striker is in an extended position.
Figure 27:
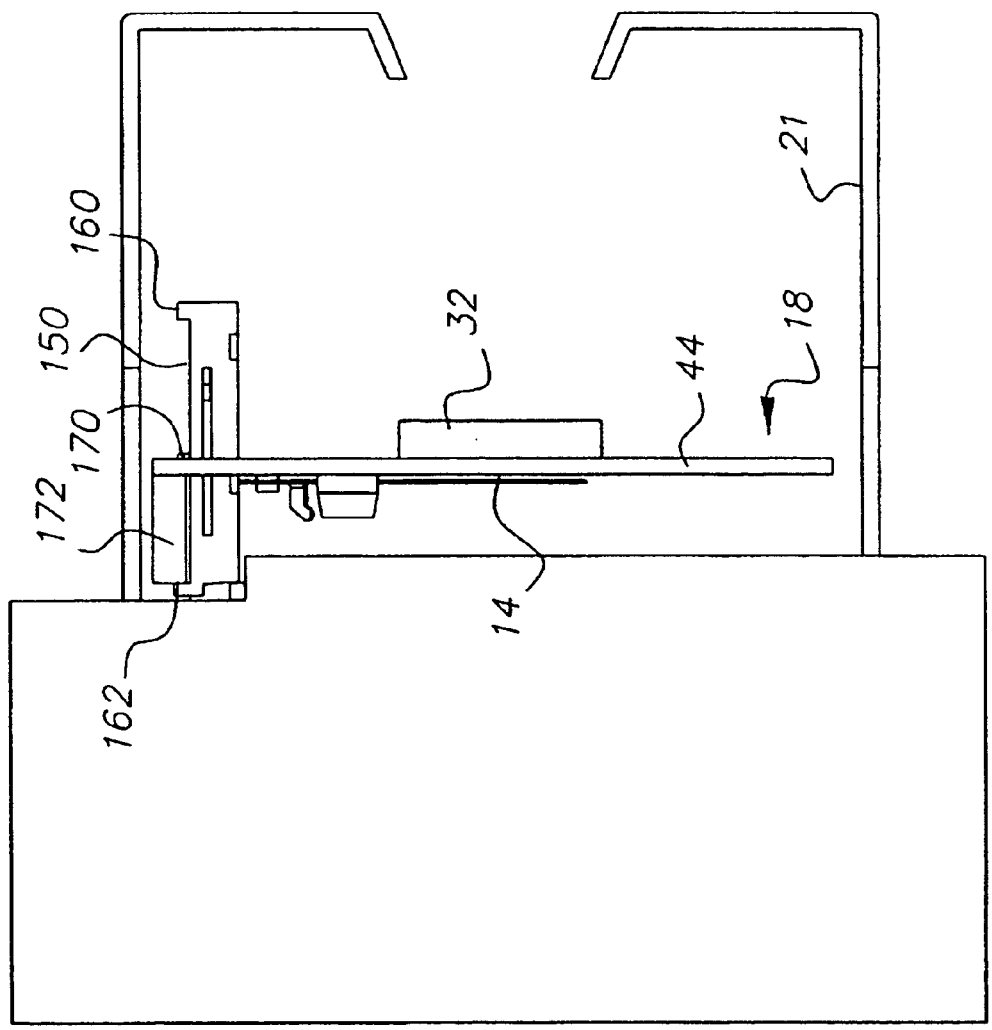
FIG. 27 is the same view as FIG. 26, but the striker is in a retracted position.

The movable striker member 154 can have a pair of opposed bumpers 160,162 that engage parts of the lens barrel 18 during extension and retraction, resulting in movement of the second striker member 154 between extended and retracted positions. In the embodiments illustrated, front and rear bumpers 160,162 extend outward at either end of the second striker member 154. The second striker member 154, including the front bumper 160, protrudes through an opening 168 in the cross wall 44 of the traveler 32 and the front bumper 160 is positioned so as to contact an edge 170 (see FIG. 27) of the traveler 32 adjoining the opening 168. When the traveler 32 is extended, the edge 170 pushes against the front bumper 160, propelling the second striker member 154 forward. In the embodiment of FIGS. 26–27, the lens barrel 18 extends and retracts within the front cover 21. In this case, an auxiliary member 172 extends rearward from the traveler 32. When the lens barrel 18 is retracted, the traveler 32 moves rearward and the auxiliary member 172 pushes against the rear bumper 162, propelling the second striker member 154 rearward. In the embodiment of the FIGS. 28–31, the lens barrel 18, which has a cap 174 at the end, itself extends and retracts into the lens base 24. In this case, when the lens barrel 18 is retracted, the traveler 32 is moved backwards and the cap 174 pushes on the end of the second striker member 154, propelling the second striker member 154 rearwards.

The telescoping striker 150 can be used in place of a non-telescoping striker in a shutter actuator. The disclosure of the telescoping striker 150 in a pivoting shutter driver 78 and linearly reciprocating four-bar linkage 72 is not limiting. The telescoping striker 150 can be used, where spatial constraints allow, in other pivoting or linearly reciprocating shutter actuators.

In an embodiment illustrated in FIG. 18, the shutter actuator comprises the tie bars 66,132 and parallel bar 134 of the four bar linkage 172 earlier described. In this case the striker members 152,154 move rectilinearly.

Figure 17:
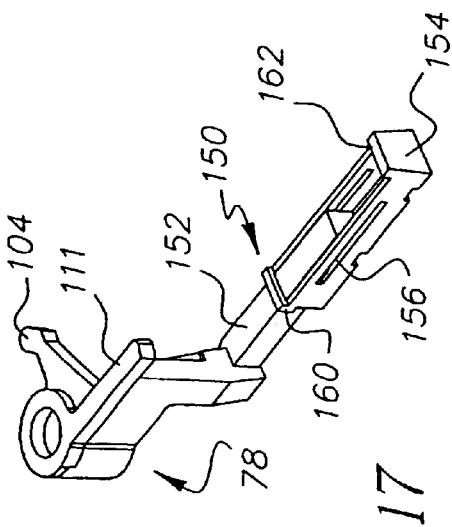
FIG. 17 is a front perspective view of the shutter driver of another embodiment of the camera frame assembly.
Figure 16:
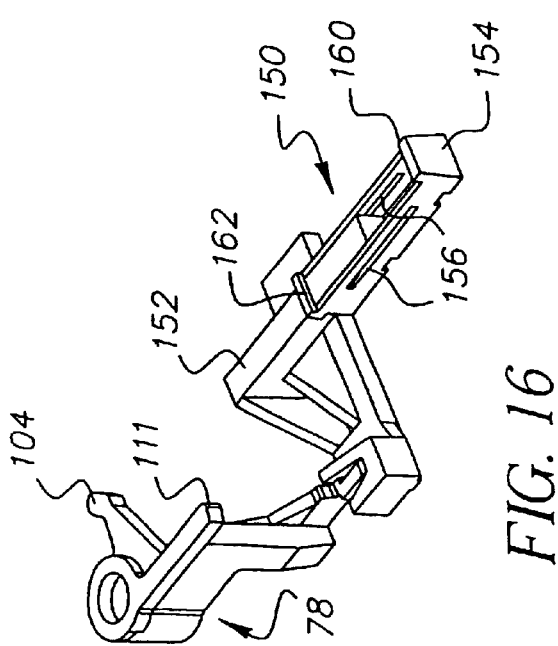
FIG. 16 is a front perspective view of the shutter driver of another embodiment of the camera frame assembly. The shutter driver includes a telescoping striker, which is shown in the extended position
Figure 20:
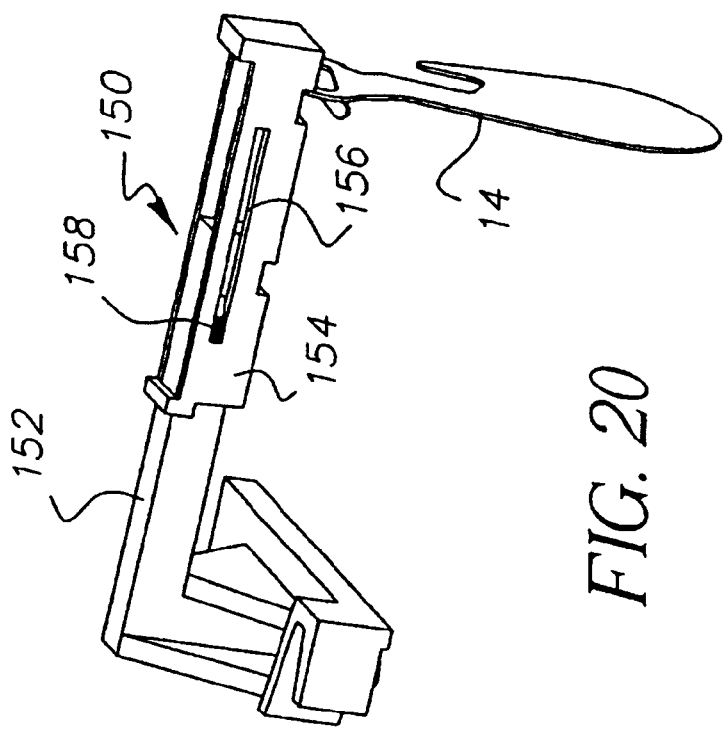
FIG. 20 is at the same view as FIG. 19, but the striker is in an extended position.
Figure 19:
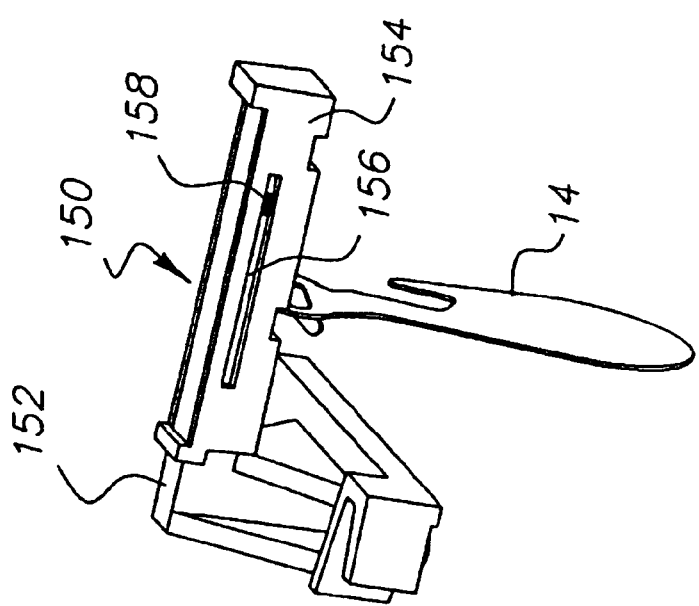
FIG. 19 is an enlarged front perspective view of the striker of FIG. 16 shown in the retracted position. The shutter is also shown.

The first striker member 152 can be positioned in different locations along the parallel bar 134. Referring now to FIG. 16–18, the first striker member 152 can be aligned with, stepped upward, or stepped downward relative to the bottom of a shutter driver 78 or driven tie bar 66. In this case, the first striker member 152 has a stem portion that extends upward or downward and, optionally, in one or more additional directions in steps. Joined to the outer end of the stem is a straight portion that is parallel to the optical axis and supports the second striker member 154.

The invention has been described in detail with particular reference to certain preferred embodiments thereof but it will be understood that variations and modifications can be effected within the spirit and scope of the invention. Feature of the invention can be modified, for example, in accordance with the disclosures of one or more of the patent applications earlier incorporated by reference herein.

What is claimed is:

1. A camera frame assembly comprising:

a frame;

a pair of tie bars extending outward from said frame, said tie bars each having opposed first and second ends, said first ends being spaced apart, said first ends each being pivotally joined to said frame a parallel bar pivotally joined to said second ends of said tie bars, said parallel bar being spaced outward from said frame, said parallel bar being movable, relative to said frame, from a charged position to a discharged position;

a striker movable with said parallel bar between said charged and discharged positions;

an impact shutter movable from a closed position to an open position by said striker.

2. The camera frame assembly of claim 1 wherein said parallel bar is longer than each of said tie bars.

3. The camera frame assembly of claim 1 wherein said striker is joined in fixed relation to said parallel bar.

4. The camera frame assembly of claim 1 wherein said striker and said parallel bar are parts of a one-piece polymer casting.

5. The camera frame assembly of claim 1 wherein said striker is longer than said tie bars.

6. The camera frame assembly of claim 1 wherein said striker is more rigid than said parallel bar.

7. The camera frame assembly of claim 1 wherein said striker has a main beam and at least one flange extending outward from said main beam.

8. The camera frame assembly of claim 1 wherein said striker is U-shaped in cross-section.

9. A camera frame assembly comprising:

a frame;

a traveler movable relative to said frame between an extended position and a retracted position, said traveler having a guide slot;

a pair of tie bars extending outward from frame, said tie bars each having opposed first and second ends, said first ends being spaced apart, said first ends each being pivotally joined to said frame a parallel bar pivotally joined to said second ends of said tie bars, said parallel bar being spaced outward from said frame, said parallel bar being movable, relative to said frame, between a charged position and a discharged position; and a striker extending through said guide slot, said striker moving with said parallel bar in a forward direction from said charged position to said discharged position and in a return direction from said discharged position to said charged position.

10. The camera frame assembly of claim 9 wherein said striker and said parallel bar are parts of a one-piece polymer casting.

11. The camera frame assembly of claim 10 wherein said striker is U-shaped in cross-section.

12. The camera frame assembly of claim 10 wherein said striker is more rigid than said parallel bar.

13. The camera frame assembly of claim 9 wherein said striker is more rigid than said parallel bar.

14. The camera frame assembly of claim 9 wherein said striker has a main beam and at least one flange extending outward from said main beam.

15. The camera frame assembly of claim 9 further comprising an impact shutter mounted to said traveler, said impact shutter being movable from a closed position to an open position by said moving of said striker in said forward direction from said charged position to said discharged position, when said traveler is in said extended position and when said traveler is in said retracted position.

16. The camera frame assembly of claim 9 wherein said traveler defines an optical axis and has first and second cross-walls extending transverse to said optical axis, and said shutter has a pivot axle having first and second opposed ends, each said end being seated against a respective said cross-wall, said first end being blocked from translation across said first cross-wall, said second end being translatable relative to said cross-wall between a first position, wherein said axle parallels said optical axis, and a second position, wherein said axle is skewed relative to said optical axis.

17. The camera frame assembly of claim 9 further comprising a flash synchronization switch mounted to said frame, said switch being tripped by said parallel bar moving in said forward direction from said charged position to said discharged position, said switch being reset by said parallel bar moving in said return direction from said discharged position to said charged position.

18. The camera frame assembly of claim 17 wherein said switch having a pair of contacts and an L-shaped link adjoining said contacts, said link having a pair of orthogonal arms, said link being pivotable about an axis between said arms from a set position to a tripped position, by said moving of said parallel bar from said charge position to said discharge position, said link being returnable to said set position by said moving of said parallel bar from said discharge position to said charge position, said contacts being disengaged in said set position and engaged in said tripped position.

* * * * *